US006282294B1

United States Patent
Deo et al.

(10) Patent No.: US 6,282,294 B1
(45) Date of Patent: Aug. 28, 2001

(54) SYSTEM FOR BROADCASTING TO, AND PROGRAMMING, A MOTOR DEVICE IN A PROTOCOL, DEVICE, AND NETWORK INDEPENDENT FASHION

(75) Inventors: Vinay Deo, Bellevue; David Tuniman, Redmond; Pamela Goldschmidt, Seattle; Michael J. O'Leary, Redmond; Don Kadyk, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/108,953

(22) Filed: Jun. 30, 1998

Related U.S. Application Data

(60) Provisional application No. 60/075,123, filed on Feb. 13, 1998, provisional application No. 60/074,236, filed on Feb. 10, 1998, and provisional application No. 60/070,720, filed on Jan. 7, 1998.

(51) Int. Cl.[7] .............................. H04K 9/00; G06F 11/30; G06F 12/14; H04L 9/32
(52) U.S. Cl. .......................... 380/270; 713/189; 713/191
(58) Field of Search .................... 455/418–419, 455/68, 38.1, 412; 380/270, 273; 713/189, 191

(56) References Cited

U.S. PATENT DOCUMENTS

| | | |
|---|---|---|
| 4,724,521 | 2/1988 | Carron et al. . |
| 4,910,510 | 3/1990 | Davis et al. . |
| 5,182,553 | 1/1993 | Kung . |
| 5,199,072 | 3/1993 | White et al. . |
| 5,222,137 | 6/1993 | Barrett et al. . |
| 5,331,634 | 7/1994 | Fischer . |
| 5,384,847 | 1/1995 | Hendrickson et al. . |
| 5,386,468 | 1/1995 | Akiyama et al. . |
| 5,481,610 | 1/1996 | Doiron et al. . |
| 5,546,077 | 8/1996 | Lipp et al. . |
| 5,546,422 | 8/1996 | Yokev et al. . |
| 5,561,702 | * 10/1996 | Lipp et al. ........................... 455/31.2 |
| 5,615,268 | 3/1997 | Bisbee et al. . |
| 5,687,394 | 11/1997 | Nakamura . |
| 5,828,311 | * 10/1998 | Ostlund ........................... 340/825.44 |
| 6,044,265 | * 3/2000 | Roach, Jr. ............................. 455/419 |
| 6,088,457 | * 7/2000 | Parkinson ............................ 380/270 |

FOREIGN PATENT DOCUMENTS

| | | |
|---|---|---|
| 0 592 079 A2 | 4/1994 | (EP) . |
| 0 786 913 A2 | 1/1997 | (EP) . |
| 2 309 860 | 8/1997 | (GB) . |
| 2 313 519 | 11/1997 | (GB) . |
| WO 93/16565 | 8/1993 | (WO) . |
| WO 95/23468 | 2/1995 | (WO) . |
| WO 96/07967 | 3/1996 | (WO) . |
| WO 96/14717 | 5/1996 | (WO) . |
| WO 97/12460 | 4/1997 | (WO) . |
| WO 97/14236 | 4/1997 | (WO) . |

OTHER PUBLICATIONS

"Platform Independent Radio Configurator", by Bernd Lehr and Wolfgang Schier, *Technical Developments,* vol. 31, No. 7, Jun. 1997, pp. 94–95.

* cited by examiner

Primary Examiner—Gilberto Barron, Jr.
Assistant Examiner—Bryan Latham
(74) Attorney, Agent, or Firm—Joseph R. Kelly; Westman, Champlin & Kelly, P.A.

(57) ABSTRACT

The present invention is directed, in one embodiment, to a programming interface which enables device/protocol/network independent transmission of messages to, and programming of, mobile devices. In another embodiment, the present invention is directed to data structures maintained on, and supported by, the mobile devices. The present invention also, in another embodiment, provides security for programming messages and an acknowledgement channel over which the mobile device can acknowledge receipt of, and successful implementation of, a programming message.

16 Claims, 14 Drawing Sheets

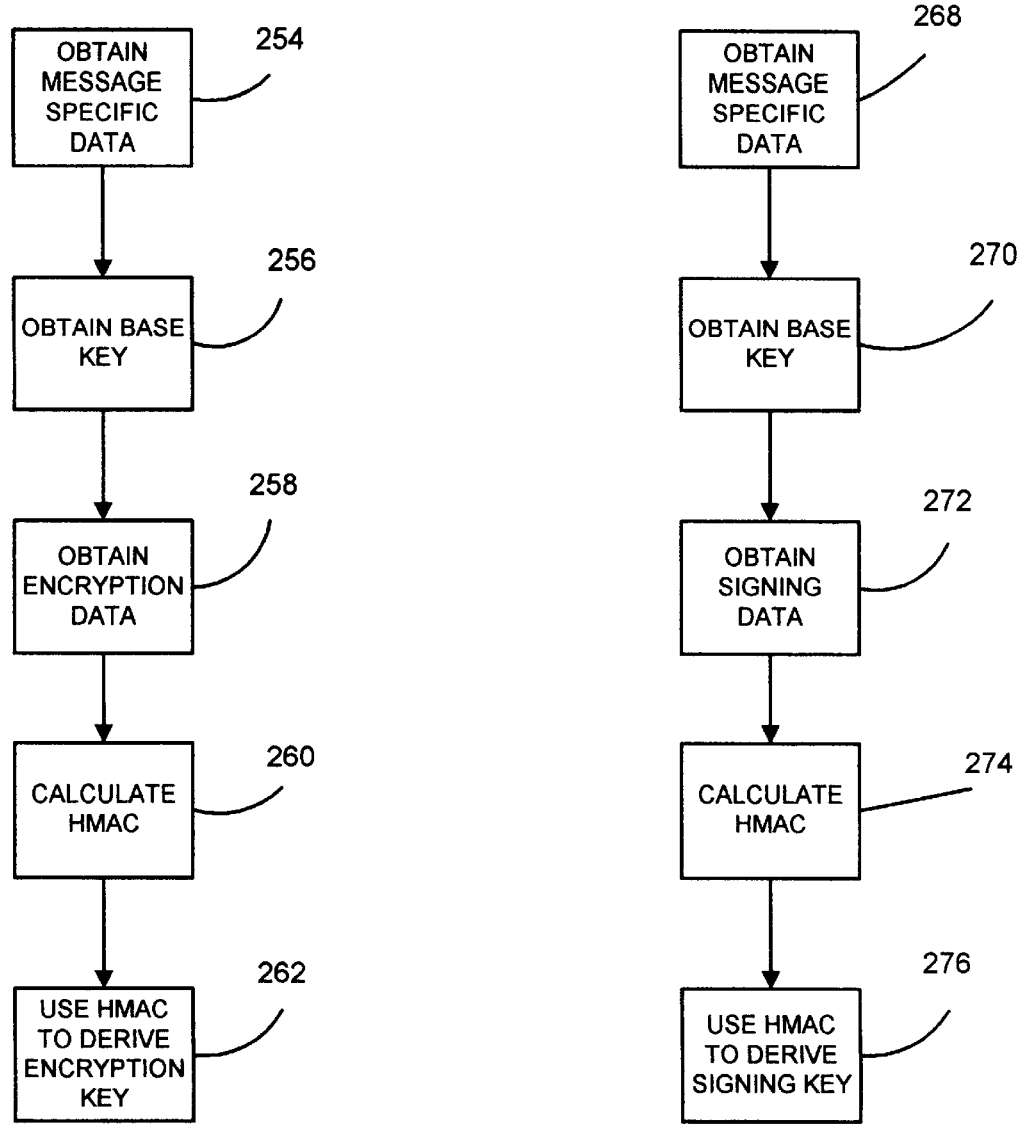

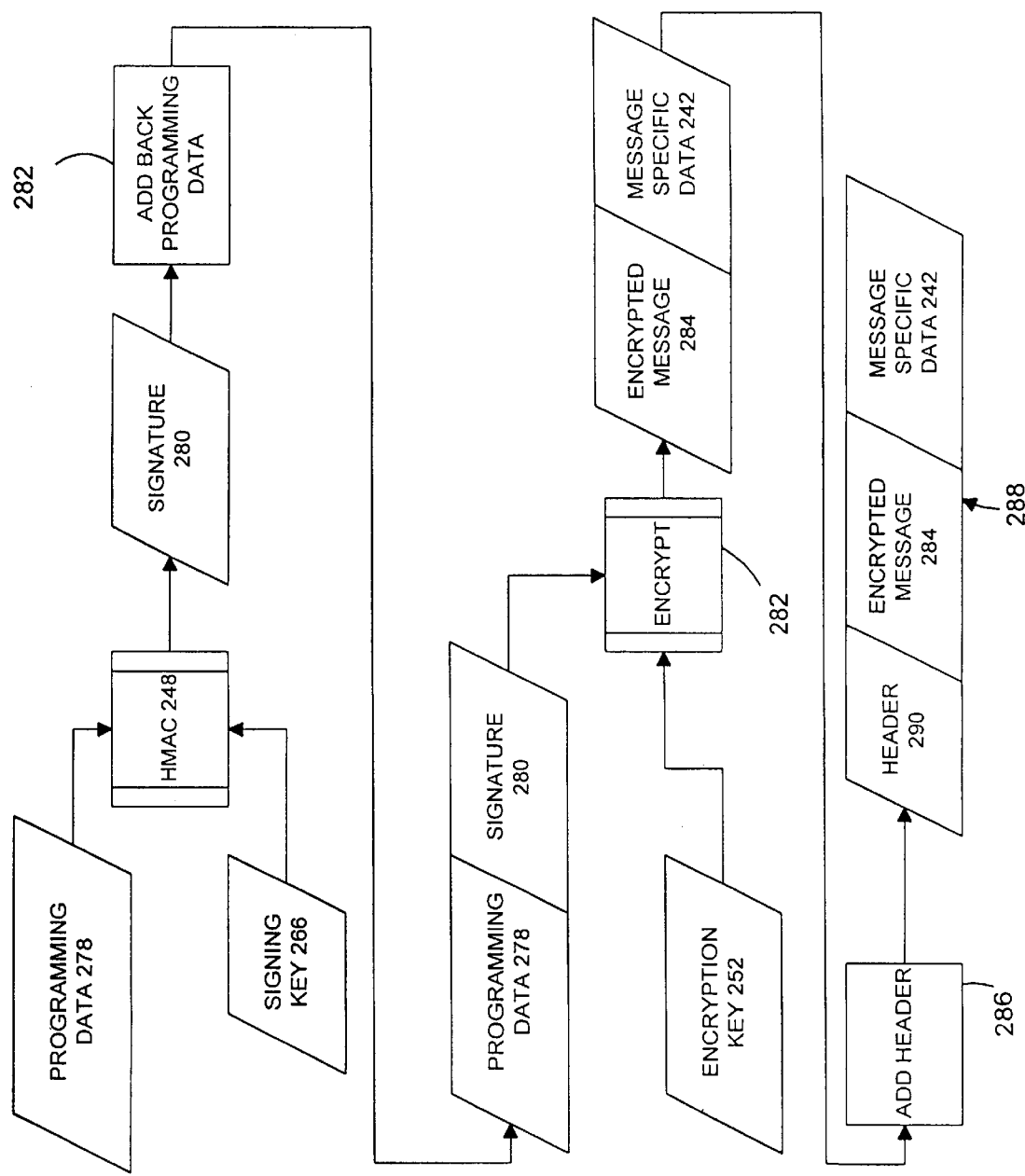

SYSTEM FOR BROADCASTING TO, AND PROGRAMMING, A MOTOR DEVICE IN A PROTOCOL, DEVICE, AND NETWORK INDEPENDENT FASHION

REFERENCE TO CO-PENDING APPLICATION

The present application claims priority from U.S. provisional application Ser. No. 60/070,720 filed on Jan. 7, 1998 entitled FEATURES OF TRANSMISSION AND MANIPULATION OF DATA and Ser. No. 60/075,123 filed Feb. 13, 1998 entitled FEATURES OF A COMMUNICATION CHANNEL and Ser. No. 60/074,236 filed Feb. 10, 1998 entitled FEATURES OF DEVICE DRIVER.

The present invention hereby fully incorporates by reference U.S. application entitled SYSTEM FOR EFFICIENT ROUTING AND TRANSLATION OF DATA, Ser. No. 09/107,899, filed on even date herewith.

BACKGROUND OF THE INVENTION

The present invention relates to personal mobile computing devices commonly known as mobile devices. More particularly, the present invention relates to a system and method for delivering information to, and programming mobile devices.

Mobile devices are small electronic computing devices often referred to as personal digital assistants. Many such mobile devices are hand held devices, or palm size devices, which comfortably fit within the hand. One commercially available device is sold under the tradename HandHeld PC (or H/PC) having software provided by Microsoft Corporation of Redmond, Washington.

Generally, the mobile device includes a processor, random access memory (RAM), and an input device such as a keyboard and a display. The keyboard can be integrated with the display, such as when the keyboard is incorporated as a touch sensitive display. A communication interface is optionally provided and is commonly used to communicate with the desktop computer. A replaceable or rechargeable battery powers the mobile device. Optionally, the mobile device can receive power from an external power source that overrides or recharges the built-in battery.

In some prior applications, the mobile device is used in conjunction with the desktop computer. For example, the user of the mobile device may also have access to, and use, a desktop computer at work or at home or both. The user typically runs the same types of applications on both the desktop computer and on the mobile device. Thus, it is quite advantageous for the mobile device to be designed to be coupled to the desktop computer to exchange information with, and share information with, the desktop computer.

Another technique for providing information to such mobile devices is through a wireless transmission link. Such information can include electronic mail or news, weather, sports, traffic and local event information. The information is typically obtained from a desktop computer connected to the Internet and delivered over a wired connection. However, it may be desirable to deliver such information over a wireless connection as well. A wireless receiver on the mobile device can act to receive information as it is being sent to the mobile device.

Where the mobile device is or has a pager, each pager in a given system has one or more addresses. When a message is transmitted over a wireless channel, it is destined for an address. All pagers assigned to that wireless channel receive the message and check the address contained in the message against its own addresses. This address-matching algorithm can be implemented either in the hardware, or in software, or in a combination of hardware and software. If the address associated with the incoming message does not match any of the addresses on the pager, then the message is discarded. However, if the address does match one of the addresses on the pager, then the message is accepted and forwarded to higher level software in the protocol stack on the pager for suitable processing.

Addresses can typically be of two types. The first is a personal address which is unique within a given wireless network (i.e., only one pager has that address). The personal address is used for sending a message to a particular pager.

The second type of address is a broadcast address. A broadcast address is typically programmed into many pagers within a given wireless network. Thus, a single message delivered over a broadcast address is received and accepted by multiple pagers in the network. Such addresses are used for implementing broadcast services, such as the news, traffic, weather, etc. services mentioned above.

There is currently no convenient way to reprogram the addresses in mobile devices, such as pagers. Instead, the pagers must be brought back to a service center where special tools are used to access and modify the internal storage of the pager, where the addresses are stored. Some prior systems have attempted to accomplish over-the-air programming. In such systems, the network owner (or carrier) sends a special message to the pager that changes the addresses in the pager.

However, to date, this has been quite uncommon. Each manufacturer of pagers has its own proprietary message formats and methods in the radio hardware and software associated with the pager. Thus, a special message needs to be specially formatted for the reprogramming of each of the different manufacturers' pagers. In addition, some manufacturers have more than one model or style of pager, each with its own internal proprietary message formats and methods. Thus, even a single manufacturer of pagers would be required to have a variety of special programming messages sent, based upon the particular type of pager being used by the user.

Further, over-the-air programming presents significant difficulties with respect to security. In other words, if the provider of the broadcast services being programmed wishes to charge users a fee or subscription price to receive the broadcast services, then the programming messages must be highly secure. Otherwise, unauthorized programming of the pager devices to receive the broadcast services would be problematic.

Further, with the advent of global computer networks, such as the Internet, and information, broadcast services, have become prevalent and important. However, a typical pager can only have a limited number of addresses (usually 2–8). A much larger number of broadcast services would desirably be offered to suit a wide range of interests and needs for the various users of the pagers. That being the case, each individual user would need to have the pager reprogrammed (by taking it back to a service center) so that it contained the addresses which would select desired broadcast services, desired by the individual user. This would need to be done each time the user wished to add, delete, or change the broadcast services selection. This is highly cost inefficient and is believed to have at least stunted the growth and proliferation of such broadcast services.

Over-the-air programming also presents another significant hurdle—reliability. For instance, even if a programming message were to be transmitted over the air, the programming message could contain errors once received by the pager, or the pager could be out of the service area, or turned off, when the programming message was transmitted. In a one-way paging system (which is the most prevalent system in the world today) there is no way for a sender to know that the programming message was actually received successfully by the desired pager.

SUMMARY OF THE INVENTION

The present invention is directed, in one embodiment, to a programming interface which enables device/protocol/network independent transmission of messages to, and programming of, mobile devices. In another embodiment, the present invention is directed to data structures maintained on, and supported by, the mobile devices. The present invention also, in another embodiment, provides security for programming messages and an acknowledgement channel over which the mobile device can acknowledge receipt of, and successful implementation of, a programming message.

BRIEF DESCRIPTION OF THE DRAWINGS

FIGS. 9A and 9B illustrate a portion of an encryption scheme in accordance with one aspect of the present invention.

FIGS. 10A and 10B illustrate another portion of an encryption scheme in accordance with one aspect of the present invention.

FIGS. 11A and 11B illustrate the preparation of a programming message in accordance with one aspect of the present

DETAILED DESCRIPTION OF THE PREFERRED EMBODIMENTS

Figure 1:
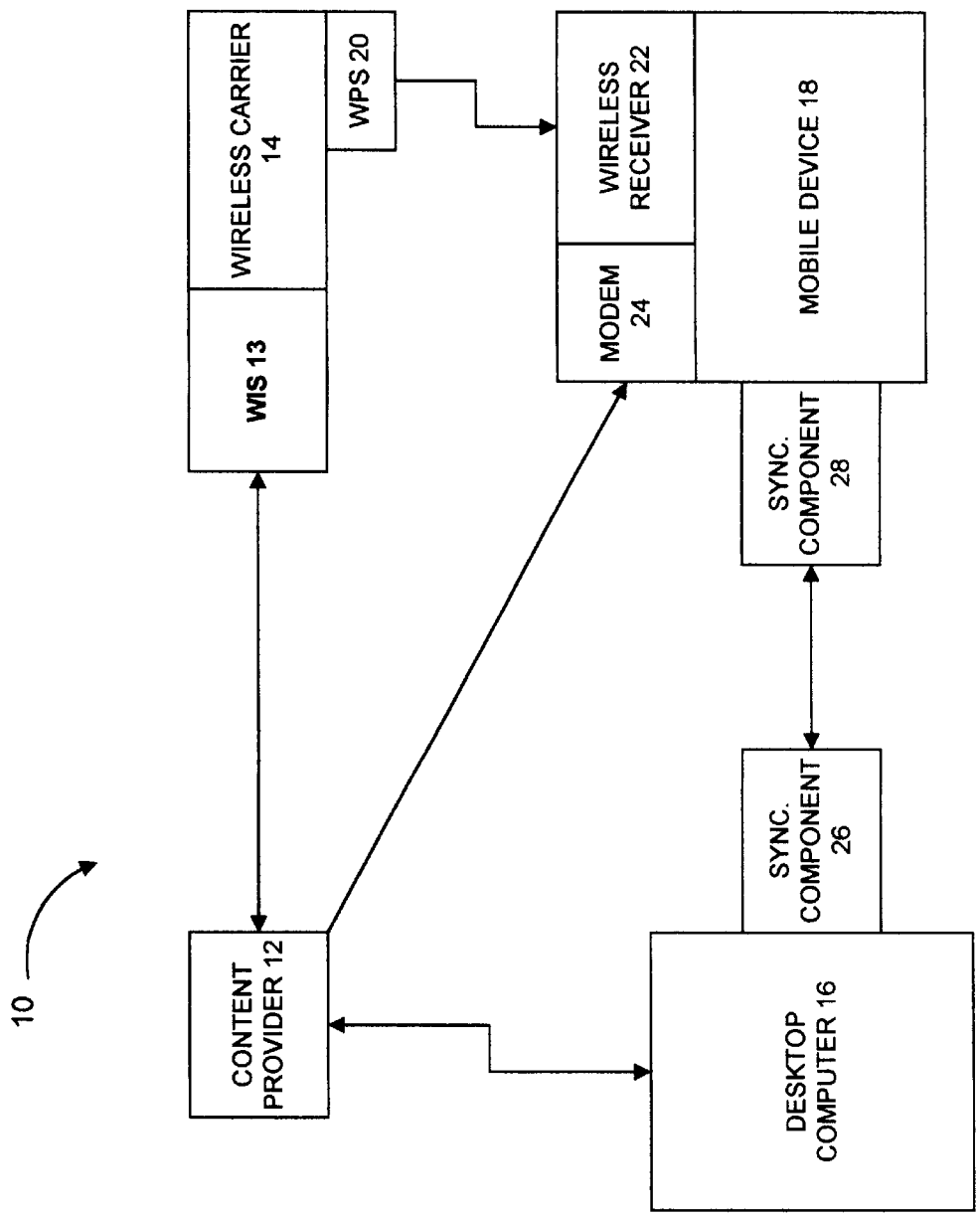
FIG. 1 is a simplified block diagram illustrating one embodiment of a mobile device in a system in accordance with the present invention.

FIG. 1 illustrates a system 10 in which the present invention is illustratively implemented. System 10 includes content provider 12, wireless carrier 14, desktop computer 16 and mobile device 18. Content provider 12 provides any suitable type of data from a database or other data source. For example, content provider 12 is discussed hereinafter as a provider of wireless services or other types of services which may be desired by a user of mobile device 18. Examples of such services include news, weather and sports services, stock quote services, traffic report services, etc.

Wireless carrier 14 is described in greater detail later in the application. Briefly, however, wireless carrier 14 is configured to receive service content and programming messages (hereinafter content) from content provider 12 via dial-up or direct internet connection, or a network connection. The way in which wireless carrier 14 obtains information from content provider 12 can include proprietary or non-proprietary means. For example, in one illustrative embodiment, wireless carrier 14 subscribes to active channels at a content provider's web site using the Internet Explorer product available from Microsoft Corporation. The Internet Explorer component pulls data from the web site and stores it on a cache for later transmission to mobile device 18.

Wireless carrier 14 also includes a wireless information server (WIS) 20. Server 20 has components which can pull data from content provider 12 as well. Server 20 also splits the content received from content provider 12 into pieces which are compatible with the particular type of transport being used by wireless carrier 14. For instance, server 20 may split the data such that it conforms to maximum packet size constraints, character set requirements, etc. for the channel type or transport type being used. Prior to transmission, the data is preferably translated to a different form. As is described in greater detail later in the application, such translation may include various forms of encryption, and may also include compression, encoding, etc. Once the data has been split appropriately such that it conforms to the transport constraints, the data is then configured for transmission over the air through a wireless network (such as through a paging channel) to be received directly on mobile device 18 The transmitted data is received by a wireless receiver and driver component 22 on mobile device 18 where the data is prepared for use by mobile device 18.

Mobile device 18 also preferably includes a modem 24. Thus, rather than being transmitted through wireless carrier 14, the service content can be transmitted directly from content provider 12 through a direct dial-up modem connection to mobile device 18.

Desktop computer 16 will also be described in greater detail later in the specification. Briefly, however, desktop computer 16 is preferably provided with a standard web browser, such as Internet Explorer 4.0, commercially available from the Microsoft Corporation of Redmond, Washington. That being the case, the users of desktop computer 16 can preferably subscribe to channels in a standard fashion which provide the user with certain channel content which can be browsed off-line or on-line. Desktop computer 16 can thus periodically retrieve or receive new content for further transmission to mobile device 18.

Desktop computer 16 also preferably includes synchronization component 26. Briefly, synchronization component 26 is configured to interact with a similar synchronization component 28 on mobile device 18 such that files which are the subject of synchronization can be synchronized from desktop computer 16 to mobile device 18, or vice versa. Once synchronized, both files (those on computer 16 and mobile device 18) contain up to date information.

More specifically, mobile device 18, in the preferred embodiment, can be synchronized with either desktop computer 16, or another mobile device 18, or both. In that instance, properties of objects stored in an object store on mobile device 18 are similar to properties of other instances of the same object stored in an object store on desktop computer 16 or another mobile device 18. Thus, for example, when a user changes one instance of an object stored in an object store on desktop computer 16, the second instance of that object in the object store of mobile device 18 is updated the next time mobile device 18 is connected to desktop computer 16 so that both instances of the same object contain up-to-date data. This is referred to as synchronization.

In order to accomplish synchronization, synchronization components 26 and 28 run on both mobile device 18 and desktop computer 16 (or another mobile device 18). The synchronization components communicate with one another through well defined interfaces to manage communication and synchronization.

It is worth noting that, in the preferred embodiment, while mobile device 18 can be coupled to desktop computer 16, it can be also coupled to another mobile device 18. This connection can be made using any suitable, and commercially available, communication link and using a suitable communications protocol. For instance, in one preferred embodiment, mobile device 18 communicates with either desktop computer 16 or another mobile device 18 with a physical cable which communicates using a serial communications protocol. Other communication mechanisms are also contemplated by the present invention, such as infra-red (IR) communication or other suitable communication mechanisms.

Figure 2:
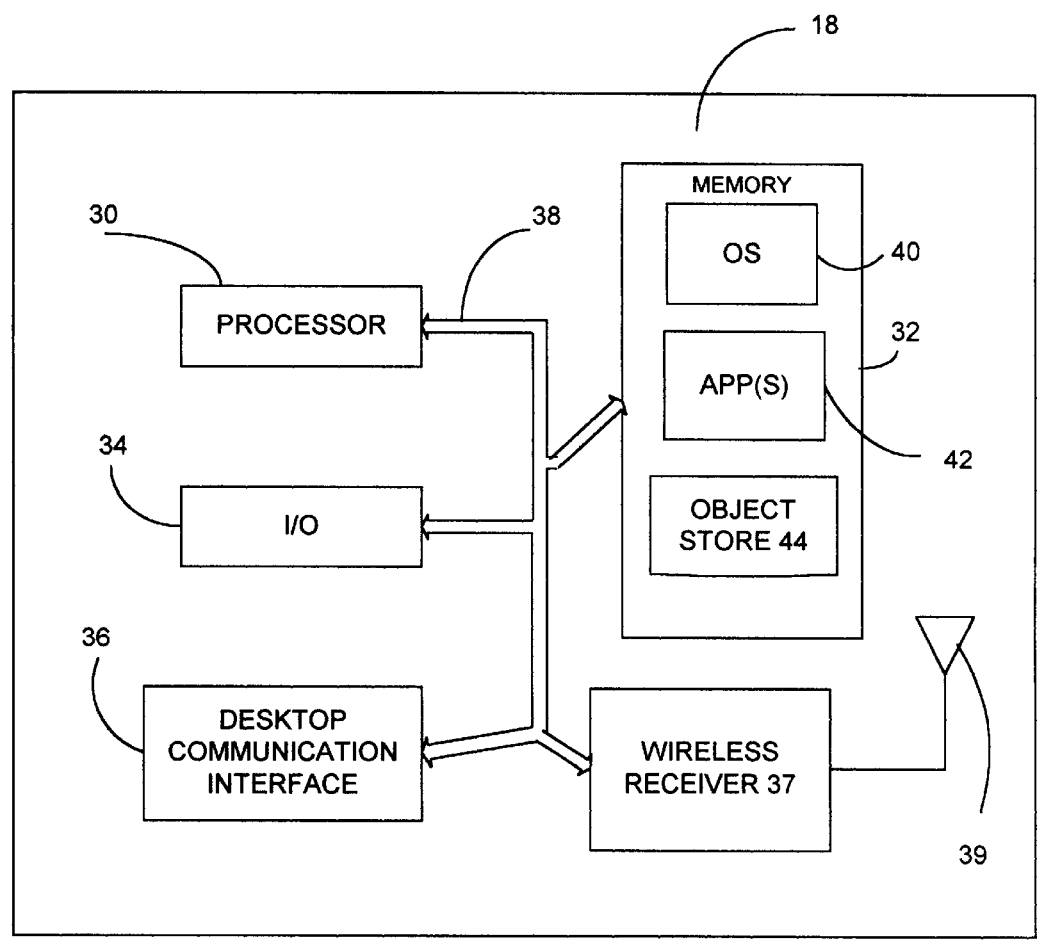
FIG. 2 is a more detailed block diagram of one embodiment of a mobile device shown in FIG. 1.

FIG. 2 is a more detailed block diagram of mobile device 18. Mobile device 18 preferably includes microprocessor 30, memory 32, input/output (I/O) components 34, desktop communication interface 36 wireless receiver 37 and antenna 39. In a preferred embodiment, these components of mobile 10 are coupled for communication with one another over a suitable bus 38.

Memory 32 is preferably implemented as non-volatile electronic memory such as random access memory (RAM) with a battery back-up module (not shown) such that information stored in memory 32 is not lost when the general power to mobile device 18 is shut down. A portion of memory 32 is preferably allocated as addressable memory for program execution, while another portion of memory 32 is preferably used for storage, such as to simulate storage on a disc drive.

Memory 32 includes operating system 40, an application program 42 (such as a personal information manager or PIM) as well as an object store 44. During operation, operating system 40 is preferably executed by processor 30 from memory 32. Operating system 40, in one preferred embodiment, is a Windows CE brand operating system commercially available from Microsoft Corporation. The operating system 40 is preferably designed for mobile devices, and implements database features which can be utilized by PIM 42 through a set of exposed application programming interfaces and methods. The objects in object store 44 are preferably maintained by PIM 42 and operating system 40, at least partially in response to calls to the exposed application programming interfaces and methods.

I/O components 34, in one preferred embodiment, are provided to facilitate input and output operations from a user of mobile device 18. I/O components 34 are described in greater detail with respect to FIGS. 3 and 4.

Desktop communication interface 36 is optionally provided as any suitable communication interface. Interface 36 is preferably used to communicate with desktop computer 16, content provider 12, wireless carrier 14 and optionally another mobile device 18, as described with respect to FIG. 1. Thus, communication interface 36 preferably includes synchronization components 28 for communicating with desktop computer 16 and modem 24 for communicating with content provider 12. Wireless receiver and driver 22 are used for communicating with wireless carrier 14.

Figure 3:
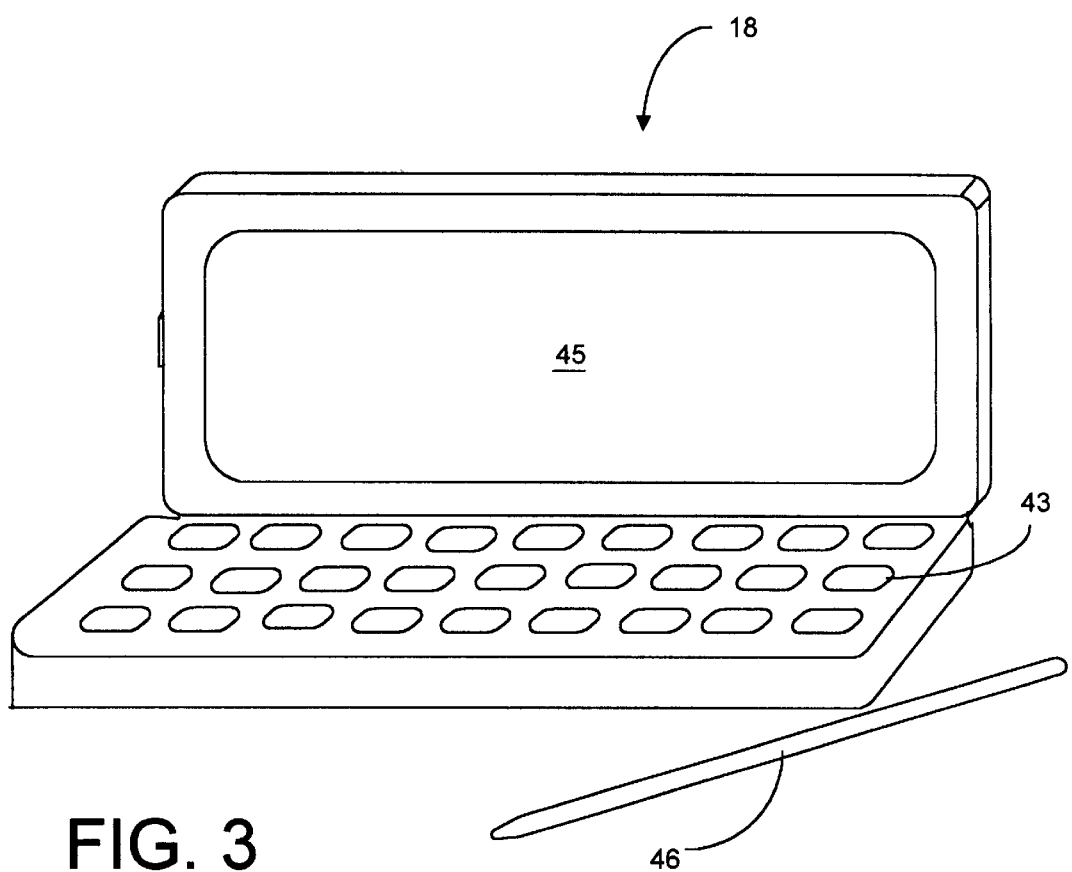
FIG. 3 is a simplified pictorial illustration of one embodiment of the mobile device shown in FIG. 2.

FIG. 3 is a simplified pictorial illustration of one preferred embodiment of a mobile device 18 which can be used in accordance with the present invention. Mobile device 18, as illustrated in FIG. 3, can be a desktop assistant sold under the designation H/PC having software provided by the Microsoft Corporation. In one preferred embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

Figure 4:
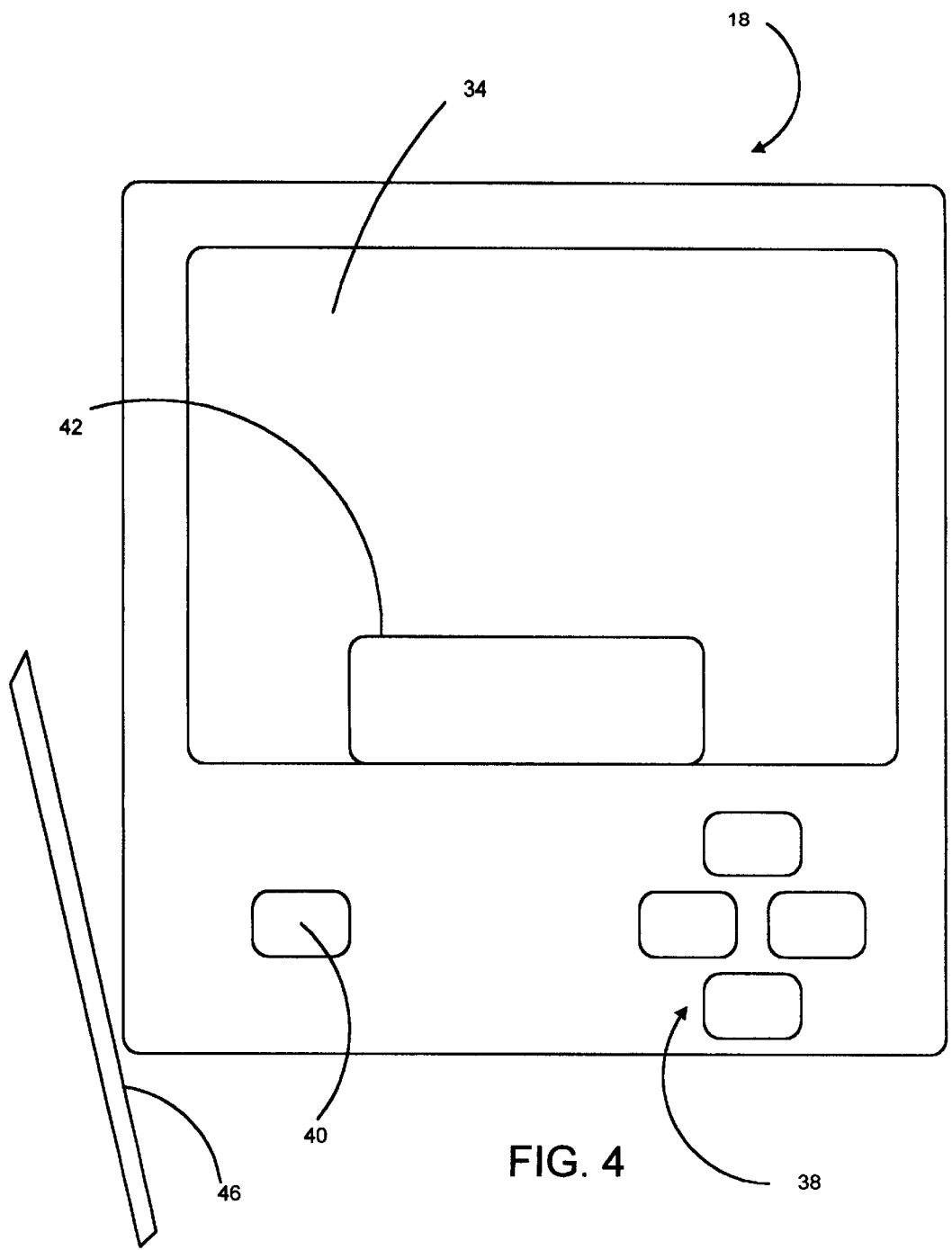
FIG. 4 is a simplified pictorial illustration of another embodiment of the mobile device shown in FIG. 2.

FIG. 4 is another simplified pictorial illustration of the mobile device 18 in accordance with another preferred embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions when mobile device 18 is implemented as a pager, screen 45 is not touch sensitive and stylus 46 is not needed.

It should be noted that the display 45 for the mobile device as shown in FIGS. 3 and 4 can be the same size as one another, or different sizes from one another, but would typically be much smaller than a conventional display used with a desktop computer. For example, displays 45 shown in FIGS. 3 and 4 may be defined by a matrix of only 240×320 coordinates, or 160×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications or select user input functions, without contacting display 45. In addition, the mobile device 18 also shown in FIG. 4 also preferably includes a power button 49 which can be used to turn on and off the general power to the mobile device 18.

It should also be noted that, in the embodiment illustrated in FIG. 4, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on the display screen 45 such that the user can review the hand written messages entered into the mobile device 18. In another preferred embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

Of course, where mobile device 18 is implemented as a pager, stylus 46 and handwriting area 51 are not needed. Instead, mobile device 18 is simply provided with screen 45, user input buttons 47 and power button 49, or other suitable items.

Figure 5:
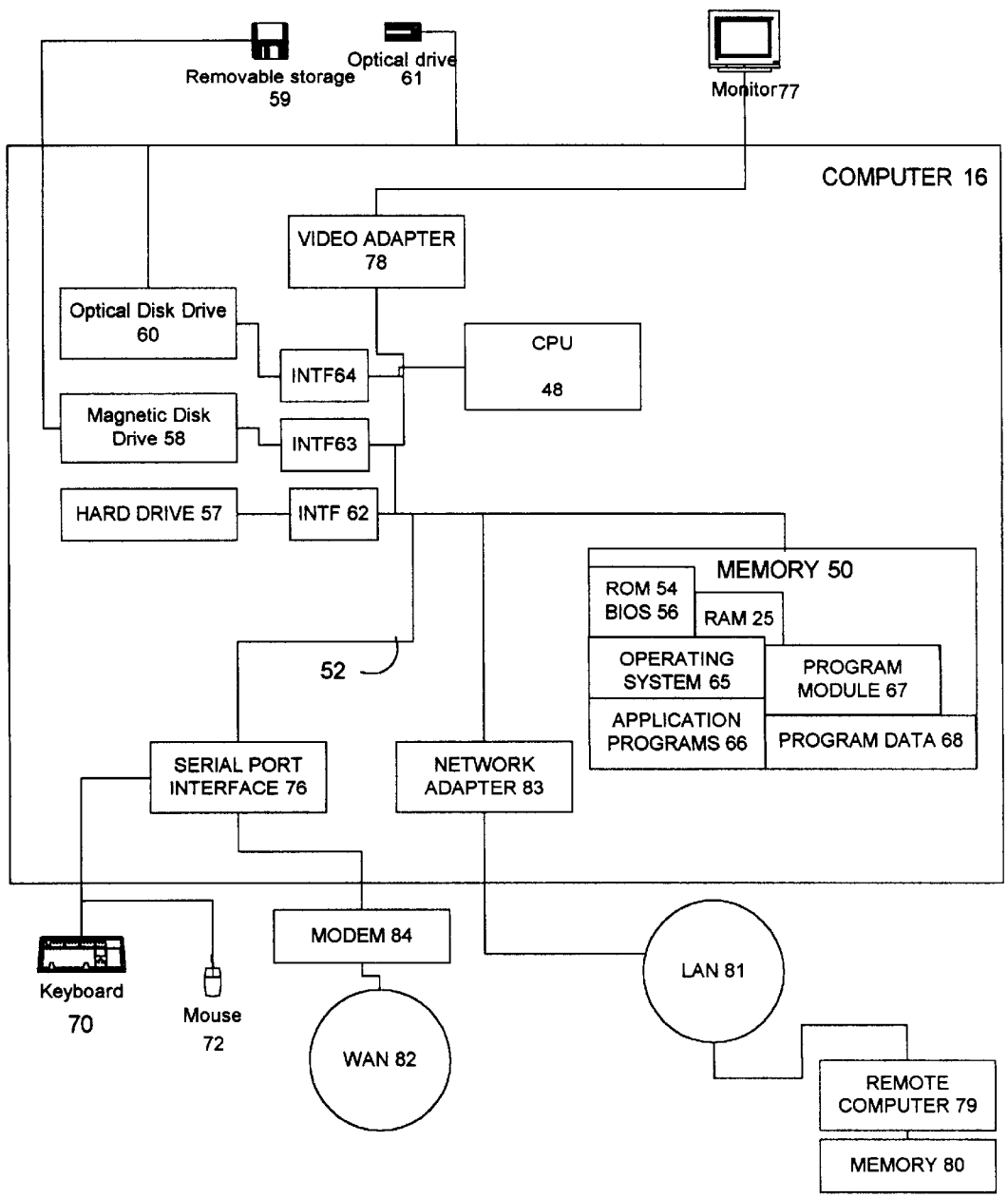
FIG. 5 is a block diagram of one embodiment of a desktop computer in accordance with one aspect of the present invention.

FIG. 5 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide nonvolatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DvDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68. A user may enter commands and information into the desktop computer 16 through input devices such as a keyboard 70, pointing device 72 and microphone 74. Other input devices (not shown) may include a joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker 75 and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 4. The logic connections depicted in FIG. 4 include a local area network (LAN) 81 and a wide area network (WAN) 82. Such networking environments are commonplace in offices, enterprise-wide computer network intranets and the Internet.

When used in a LAN networking environment, the desktop computer 16 is connected to the local area network 81 through a network interface or adapter 83. When used in a WAN networking environment, the desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, including synchronization component 26, may be stored in local or remote memory storage devices. It will be appreciated that the network connections shown are exemplary and other means of establishing a communications link between the computers may be used.

Desktop computer 16 runs operating system 65 that is typically stored in non-volatile memory 54 and executes on the processor 48. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 operating system sold by International Business Machines (IBM) of Armonk, New York. Application programs are preferably stored in program module 67, in volatile memory or non-volatile memory, or can be loaded into any of the components shown in FIG. 5 from a floppy diskette 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with the particular PIM or other program is designed specifically to work in conjunction with that PIM and to expose desktop synchronization interfaces that function as described in more detail in the above-referenced co-pending U.S. patent application according to a synchronization protocol. The DLL, in turn, calls interfaces exposed by the PIM in order to access data representing individual properties of objects maintained in an object store. The object store 6, of course, can reside in any one of the suitable memory components described with respect to FIG. 4.

Figure 6:
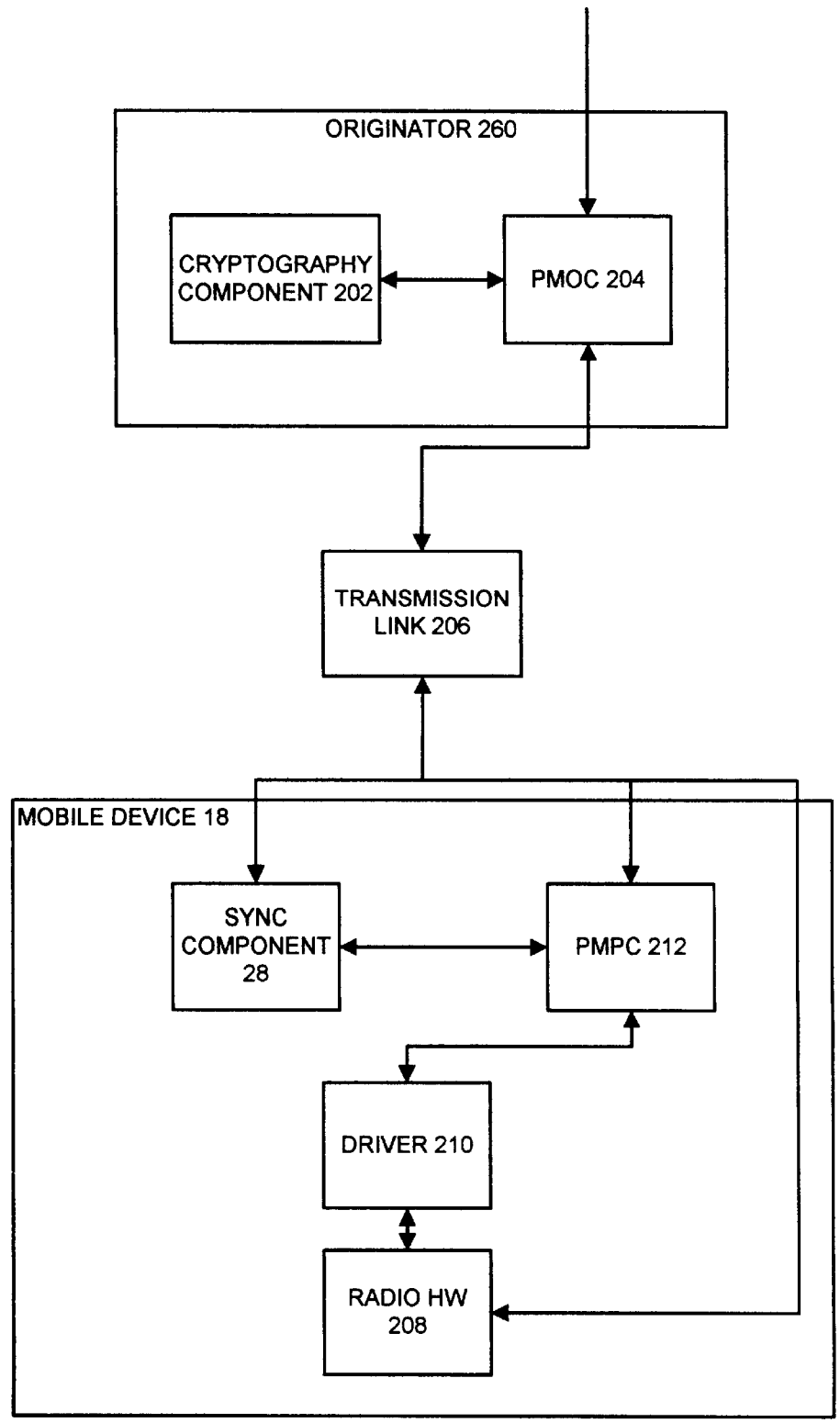
FIG. 6 is a more detailed block diagram of an originator and mobile device in accordance with one aspect of the present invention.

FIG. 6 is a more detailed block diagram of an originator 200, and a mobile device 18 which illustrates programming of mobile device 18 in accordance with one aspect of the present invention. It should be noted that originator 200 can be any source of programming information, such as content or service provider 12, or a wireless carrier 14, or any other suitable broadcast services provider. Originator 200 includes cryptography component 202 and programming message originator component (PMOC) 204. FIG. 6 also illustrates transmission link 206 which links originator 200 and mobile device 18. As described above, transmission link 206 can comprise a wireless transmission link, transmission through synchronization with a desktop computer and synchronization components 26 and 28, transmission through a global computer network (such as the Internet), or another source via a modem, an intranet, or transmission simply through the transfer of a floppy disk containing the necessary information.

Mobile device 18 is also illustrated in greater detail. Mobile device 18 includes radio hardware (or radio HW) 208 which corresponds to the actual radio receiver hardware in mobile device 18. Mobile device 18 also includes driver 210 which interfaces with radio HW 208 to pass information to radio HW 208 and receive information from radio HW 208. Device 18 also includes programming message processing component (PMPC) 212 which can be implemented in any suitable memory in mobile device 18. PMPC 212 receives messages transmitted over transmission link 206 and processes them in accordance with the techniques described below.

Figure 7:
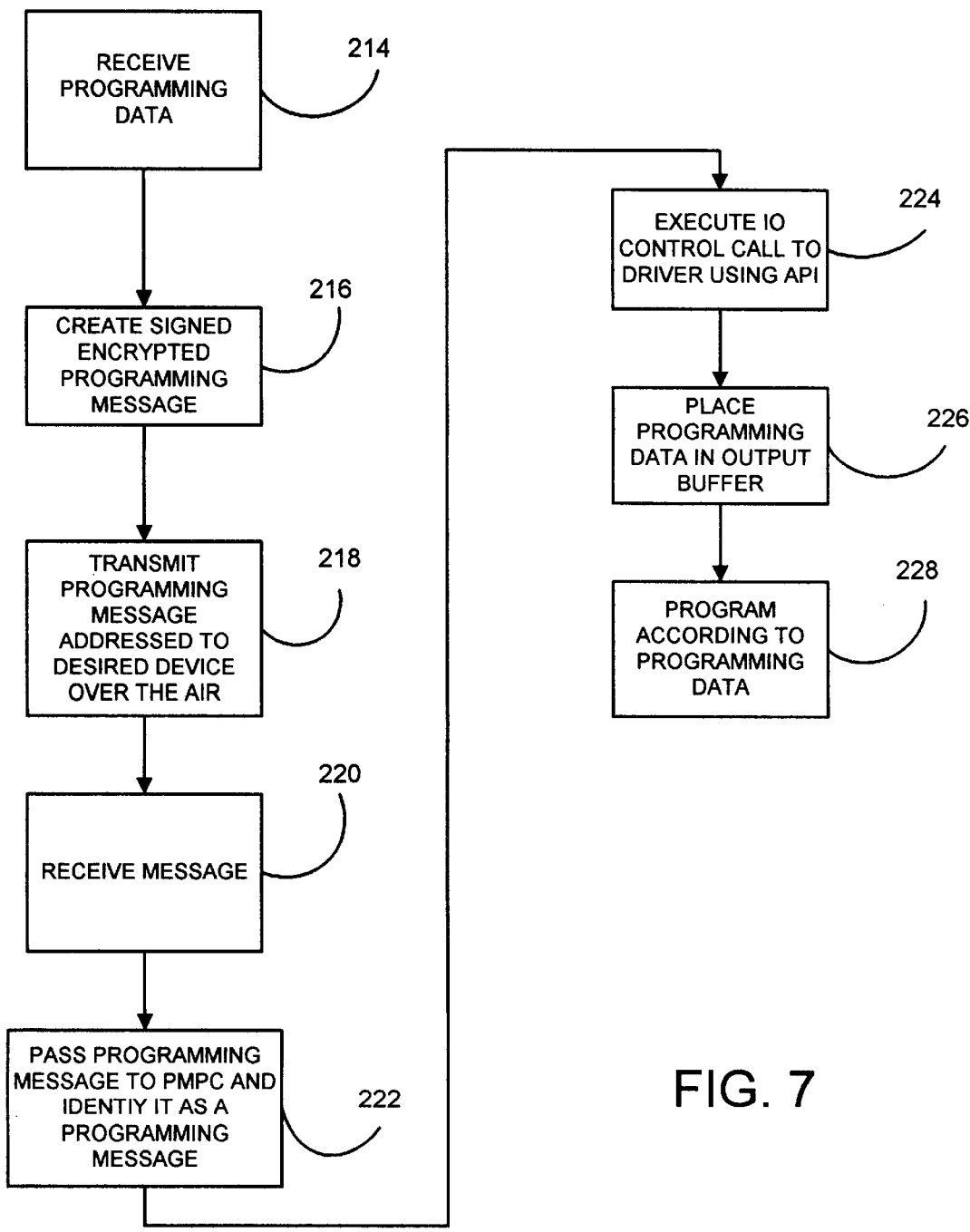
FIG. 7 is a flow diagram illustrating over-the-air programming in accordance with one aspect of the present invention.

FIG. 7 is a flow diagram illustrating programming of mobile device 18 in accordance with one aspect of the present invention. FIG. 7 will be described also with reference to FIG. 6. FIG. 7 specifically illustrates a system by which mobile device 18 is programmed using over-the-air programming. First, PMOC 204 on originator 200 receives the desired programming data to program mobile device 18. This is indicated by block 214.

PMOC 204 then accesses cryptography component 202 and creates a signed and encrypted programming message for transmission over transmission link 206 to mobile device 18. Encryption of the programming data into an encrypted programming message can be accomplished in any number of suitable ways. One method by which the encryption is implemented is described in greater detail below with respect to FIGS. 9A–11B. Encryption of the programming data into an encrypted programming message is indicated by block 216. The data can also be subjected to additional processing, such as compression, encoding, etc.

Next, the data is transmitted from originator 200 to mobile device 18. As described with respect to FIG. 6, the data can be transmitted over any suitable transmission link. With respect to the embodiment described in FIG. 7, transmission link 206 is a wireless transmission link, such as a radio frequency paging channel in which PMOC 204 provides the encrypted programming message to a radio transmitter which transmits it to radio HW 208 of mobile device 18, where the message is received. Transmission of the encrypted programming message to mobile device 18 is illustrated by block 218 in FIG. 7.

As is described in greater detail below, the encrypted programming message has a header appended thereto. The message is passed to a message router component which routes the message to PMPC 212 and through various processing steps. The header indicates the types of processing the message was subjected to prior to transmission, and the message is subjected to complementary processing (such as decoding, decompression, etc.) after being received. Receiving the message is indicated by block 220.

The router passes the message to PMPC 212 on mobile device 18. This is indicated by block 222. PMPC 212 performs any necessary translations on the encrypted programming message. PMPC 212 also detects, based on the header information, that the message is a programming message and invokes an appropriate input/output (I/O) control call to place the message in proper form so that it can be passed back to driver 210 in a desired format. In the preferred embodiment, PMPC 212 invokes I/O control calls to driver 210 using appropriate application programming interfaces (APIs) which are described in greater detail below. For example, the header information may identify that the programming message is a new address programming message. In that case, PMPC 212 invokes a RADIO_ PROGRAMMING I/O control call with a subparameter ADDRESS_PROGRAMMING to program a new address. The encrypted programming data is passed to driver 210 which calls a library function DecryptAndValidatePgmData() to decrypt and validate the programming data. Passage of the programming data, in the proper form, to the driver 210 is illustrated by block 224.

After driver 210 has decrypted and validated the programming message, the programming data is obtained in its original, unencrypted form. Driver 210 then places the actual programming data in appropriate output buffers in driver 210 for retrieval, or places them in input buffers on radio HW 208. Radio HW 208 can then perform the necessary programming in accordance with the actual programming data provided. This is indicated by blocks 226 and 228.

Figure 8:
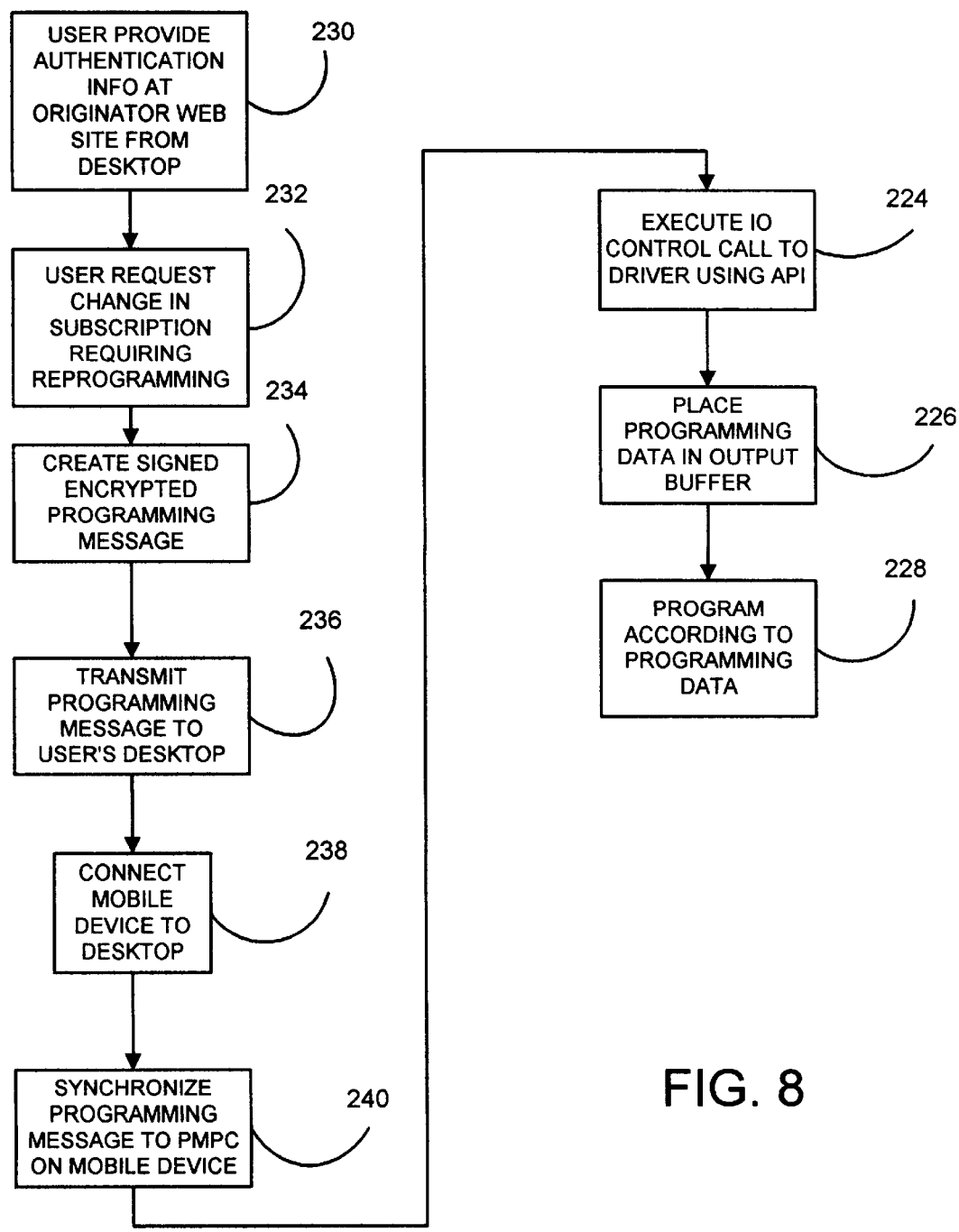
FIG. 8 is a flow diagram illustrating programming of a mobile device using a global network, such as the Internet, or the World Wide Web.

FIG. 8 is a flow diagram illustrating programming of mobile device 18 using over-the-web programming. First, a user of mobile device 18, in one exemplary embodiment, logs onto the web site of the broadcast service provider of the services desired by the user. The user provides authentication information at the web site of originator 200, from the desktop computer 16. Such authentication information can, in one example, include the users name and the personal identification number (PIN) of the mobile device 18 for which programming is sought. This is indicated by block 230 in FIG. 8.

The user then requests a change in the subscription services received on mobile device 18. Such a change may include addition of a service, deletion of a service or modification of a service and will likely require reprogramming of the addresses, or other information, stored in mobile device 18, so that mobile device 18 can receive a new subscription service, or so that a subscription service can be cancelled and no longer provided to mobile device 18. The user typically provides this information from the desktop computer through which the originator's website has been accessed. This is indicated by block 232.

Originator 200 then creates a signed and encrypted programming message for eventual transmission to mobile device 18. This is described in greater detail below and is illustrated by block 234.

After the encrypted programming message is created at originator 200, it is transmitted over transmission link 206 to mobile device 18. In the embodiment illustrated in FIG. 8, transmission link 206 comprises an Internet connection between the user's desktop computer and the website of the originator. Thus, the crypted programming message is transferred to the user's desktop computer, as illustrated by block 236.

The user then connects mobile device 18 to the desktop computer. As described above, this type of connection can be formed in any suitable manner, such as through a hardwire connection (or cable) using serial communication, through an infrared transmission link, or through any other suitable connection mechanism. This is indicated by block 238.

The user then requests synchronization between the desktop computer and mobile device 18. As described above, synchronization components 26 and 28 interact according to a synchronization protocol which causes the encrypted programming message to be synchronized to mobile device 18. More specifically, synchronization component 28 causes the encrypted message to be transferred to PMPC 212 on mobile device 18. The synchronization step is illustrated by block 240.

From this point, processing continues in exactly the same fashion as it did beginning with block 224 of the over-the-air programming system set out in FIG. 7. Similar blocks are similarly numbered to those shown in FIG. 7. Specifically, PMPC 212 executes any translations required on the encrypted programming message and places the encrypted programming message in proper form so that it can be passed to driver 210. PMPC 212 then invokes I/O control calls to driver 210 using appropriate APIs, in order to pass the encrypted programming message back to driver 210 for decryption and validation. This is indicated by block 224.

Once the data has been decrypted and validated by driver 210, the programming data, in its unencrypted form, is placed in appropriate buffers. This is indicated by block 226.

Radio HW 208 then executes the programming operation according to the programming data received by driver 210. This is indicated by block 228.

It should be noted that the present system for programming the radio HW 208 on mobile device 18 is protocol, channel, and device independent. In other words, once the encrypted programming message is provided to PMPC 212, the process for providing that information to driver 210, and decrypting and validating the programming message at driver 210 is exactly the same, regardless of what specific radio HW device 208 is provided, and regardless of the channel or transmission protocol over which the programming message was received.

Figure 9A:
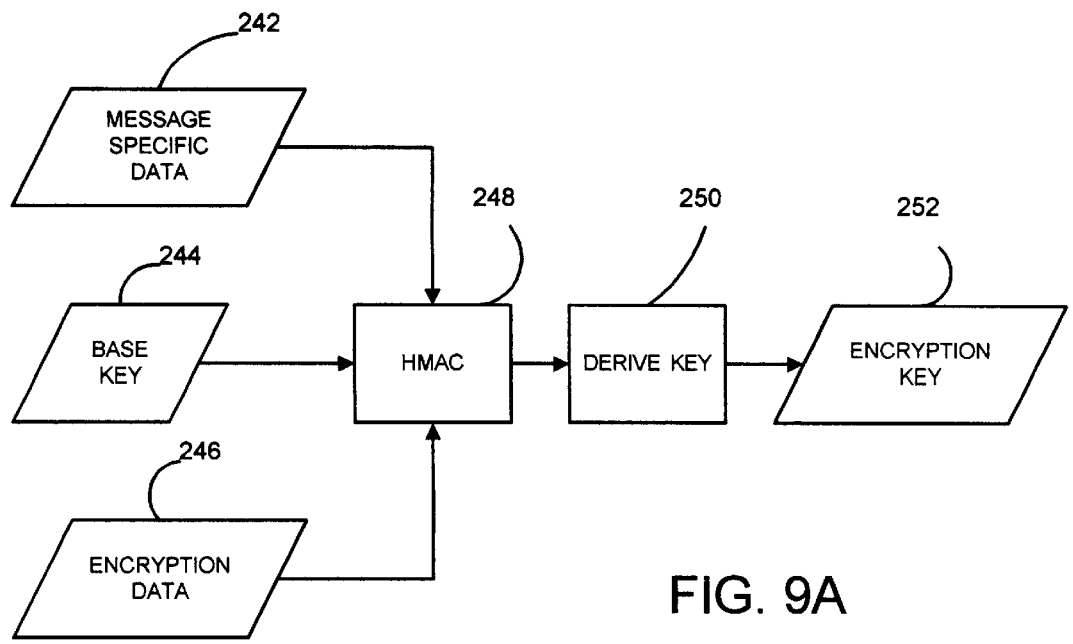

FIGS. 9A and 9B illustrate a portion of the encryption scheme performed by cryptography component 202 and PMOC 204 on originator 200. Of course, other suitable encryption schemes can be utilized, but FIGS. 9A and 9B illustrate a portion of one illustrative encryption scheme. Specifically, FIGS. 9A and 9B illustrate the formation of an encryption key for use in the encryption scheme in accordance with one aspect of the present invention.

In order to obtain the encryption key, the present invention uses message specific data 242, base key 244, and encryption data 246. The message specific data 242 is preferably a part of the message itself with a required property that it changes with each programming message being sent. Base key 244, in one illustrative embodiment, is the electronic identification (EID) of mobile device 18. However, base key 244 could also be any other key as well. Encryption data 246 is preferably formed of other known bytes or data strings. The information in blocks 242, 244 and 246 is provided to a hashed messaged authentication code (HMAC) generator 248. HMAC generator 248 derives a hash value that is used for seeding or biasing a key derivation algorithm. This biasing component is provided to key derivation component 250, which acts upon the biasing component in order to derive an encryption key 252.

FIG. 9B is a flow diagram illustrating operation of the components shown in the block diagram of FIG. 9A. First, the message specific data 242, the base key 244, and the encryption data 246 are obtained. This is indicated by blocks 254, 256 and 258. Next, the HMAC biasing component is calculated. This is indicated by block 260. Finally, the biasing component is used to derive the encryption key 254. This is indicated by block 262. In one illustrative embodiment, the API CryptDeriveKey is used in order to derive the encryption key. The API CryptDeriveKey is a standard Windows API which derives a key for standard cryptography algorithms.

It should be noted that, since the message specific data 242 changes with each message, the derived encryption key 252 will also be different for each message. This is a preferred technique for deriving such a key. Without this technique, one can compare an encrypted message with a decrypted message and simply use those two items to compute the key for subsequent messages. However, since the key changes with each message, even if one key is derived, it cannot be used to decipher later messages.

Figure 10A:
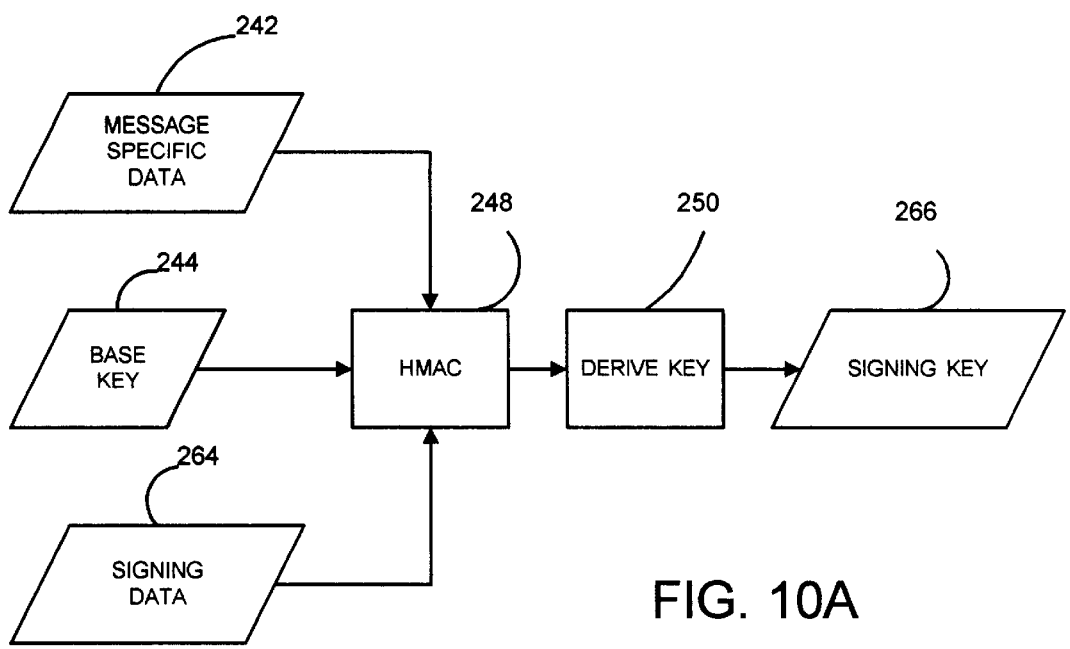

FIGS. 10A and 10B illustrate the generation of a signing key in accordance with one aspect of the present invention. A number of items are Similalry numbered to those shown in FIGS. 9A and 9B, and are similarly numbered. As with the technique illustrated in FIG. 9A, a number of components are used to form a signing key 266 in accordance with the present invention. Message specific data 242, base key 244 and signing string 264 are provided to HMAC generator 248. The message specific data 242 and base key 244 are described with respect to FIGS. 9A and 9B above. The signing string 264 is similar to the encryption string 246. However, signing string 264 is formed of other known bytes, preferably formed as a data string. HMAC generator 248 again generates a seeding or biasing value which is provided to derive a signing key as illustrated by block 250. As with FIG. 9A, the signing key is preferably formed using the CryptDeriveKey, standard Windows API in order to provide signing key 266.

FIG. 10B is a flow diagram illustrating the operation of the components shown in the block diagram of FIG. 10A. First, message specific data 242, base key 244 and signing data 264 are obtained. This is indicated by blocks 268, 270 and 272. Next, HMAC generator 248 calculates the biasing component based on the input components. This is indicated by block 274.

The biasing component is then used to bias the signing key derivation algorithm in order to obtain the signing key 266. This is indicated by block 276.

Figure 11B:
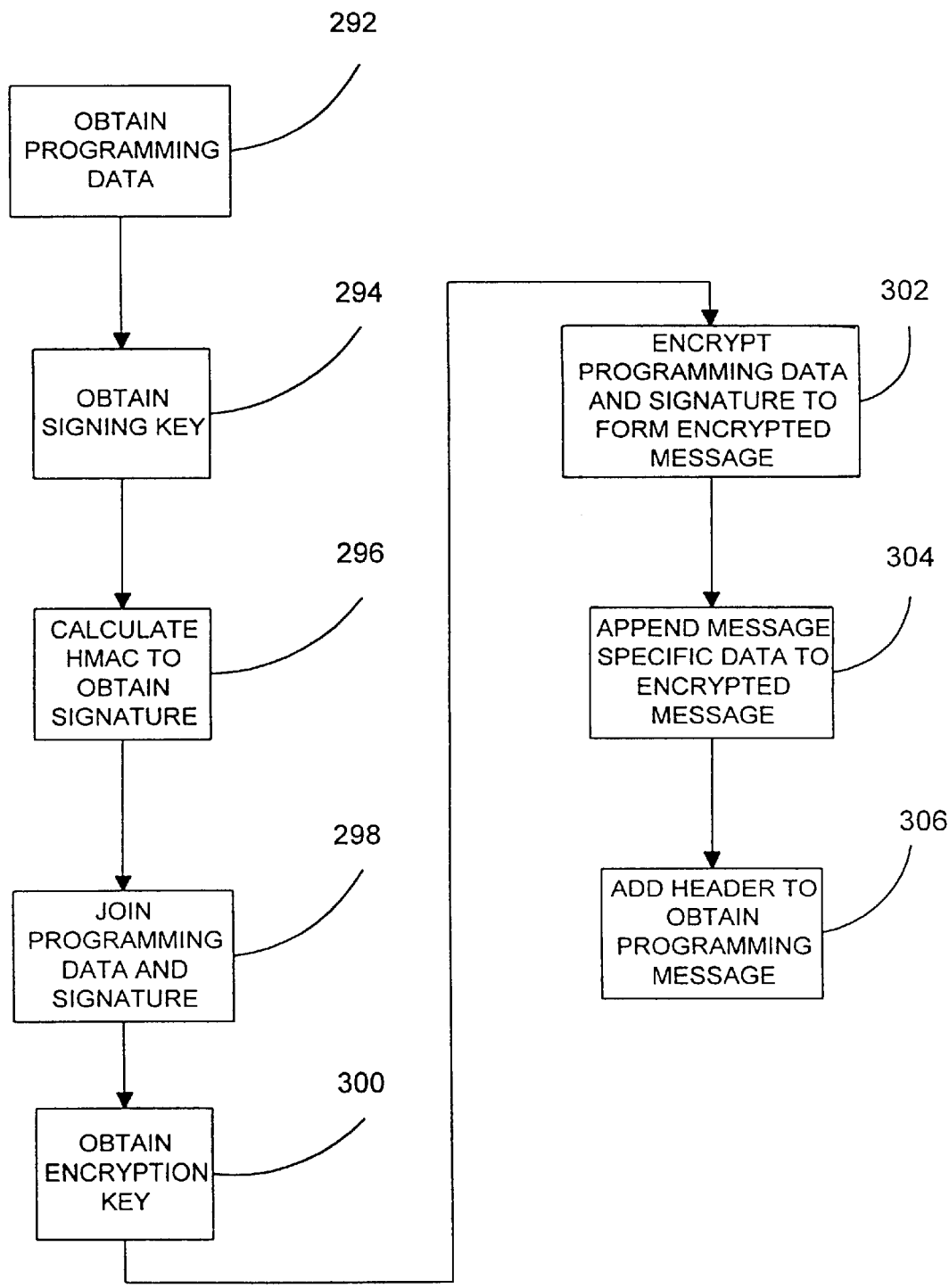

Once the signing key and encryption keys have been derived, the programming message can be prepared for transmission over transmission link 206. FIGS. 11A and 11B illustrate the preparation of the programming message for transmission over transmission link 206. The programming data 278 and the signing key 266 are applied to HMAC generator 248. This provides a signature value 280 which is based on the programming data 278 and the signing key 266. The digital signature 280 is then added to programming data 278 as indicated by block 282. The programming data 278, along with its signature 280, are then encrypted using encryption key 252. In other words, the programming data 278, along with its signature 280, and encryption key 252, are provided to encryption component 282 and any suitable encryption technique can be used. The output of encryption component 282 is an encrypted message 284 which corresponds to the programming data 278, along with its signature 280, as encrypted by the encryption key 252.

The encrypted message 284 is appended to the message specific data 242, in its unencrypted form (or plain text form). A header is added to the encrypted message 284 and message specific data 242. This is indicated by block 286. The message can be further passed through other translations such as compression, encoding, etc. The entire programming message 288 thus includes header 290, encrypted message 284, and message specific data 242. Header 290 is preferably a sequence of bytes which serves a number of purposes. First, it identifies the message 288 as a programming message. Next, it identifies the start and end of the encrypted portion 284 of the message, and the start and end of the message specific data portion 242 of message (which is not encrypted). Finally, header 290 identifies whether the EID was used as the base key.

FIG. 11B is a flow diagram illustrating the preparation of a programming message as described with respect to FIG. 11A. First, the programming message is obtained as indicated by block 292. Then the signing key 266 is obtained. This is indicated by block 294. The HMAC component 282 is then run in order to obtain signature 280. This is indicated by block 296.

The programming data is then joined with its signature. This is indicated by block 298. The encryption key is obtained and the programming data, along with its signature, is encrypted using the encryption key in order to form the encrypted message. This is indicated by blocks 300 and 302. The message specific data 242 is appended to the encrypted message, and a header is added in order to from the entire programming message transmitted over transmission link 206. Other translations can also be performed prior to transmission. These final steps are indicated by blocks 304 and 306.

The prepared message is transmitted over transmission link 206 where it eventually ends up at PMPC component 212, as described above. Once the programming message is received by PMPC 212, it is placed in proper form for being passed to driver 210 and eventually radio HW 208, where the programming is actually carried out.

Figure 12A:
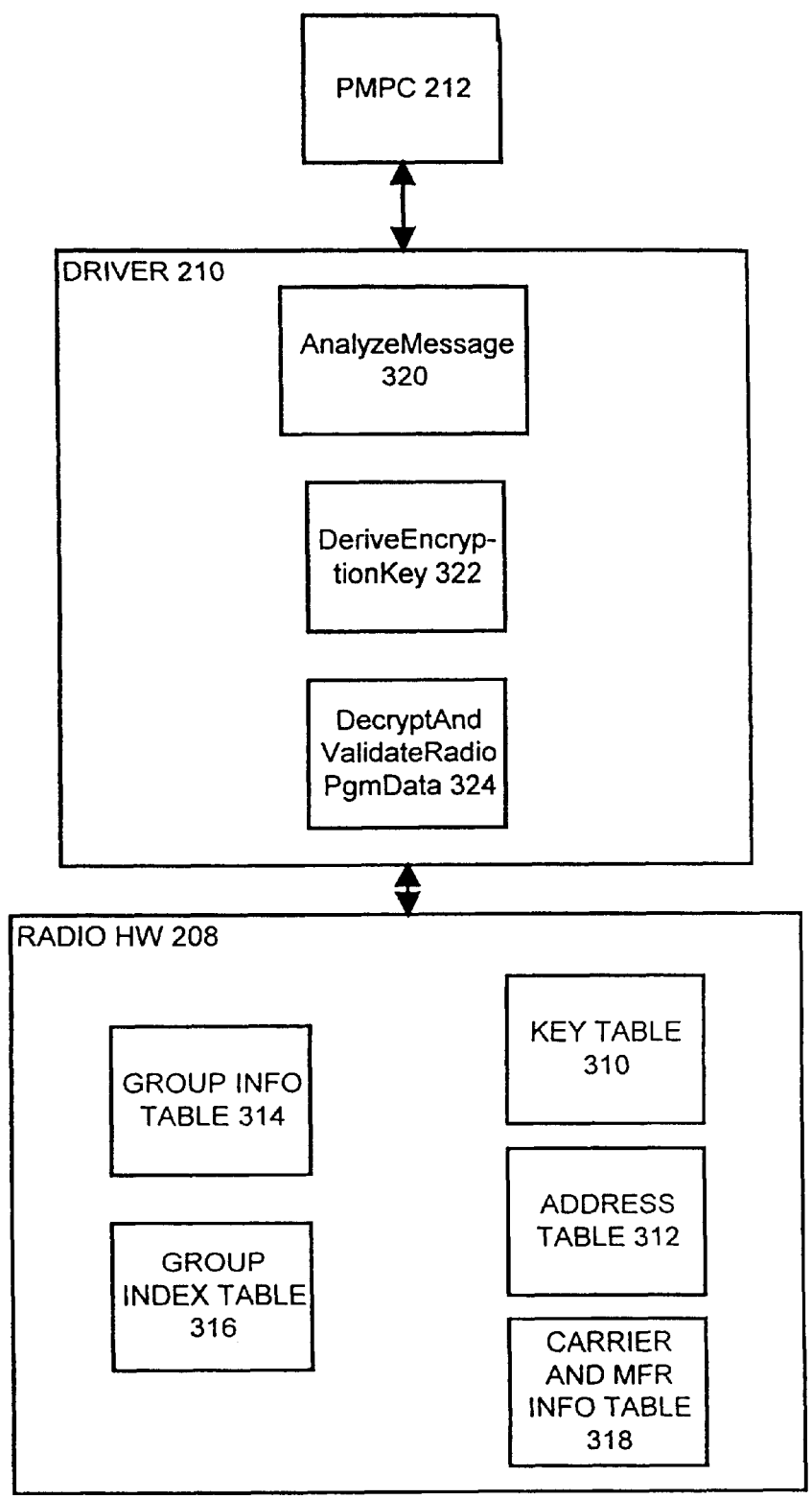
FIGS. 12A and 12B illustrate the processing of a programming message on the mobile device in accordance with one aspect of the present invention.

FIG. 12A is a more detailed block diagram of radio HW 208 and driver 210 in order to illustrate the processing in those components. FIG. 12A illustrates that radio HW 208 preferably maintains a plurality of data structures. The data structures illustrated in radio HW 208 in FIG. 12A are illustrated as tables. However, this is an exemplary illustration only. Radio HW 208 is, in actuality, free to store the data in some other manner to optimize storage or speed of access.

Also, it is not necessary for radio HW 208 to store these data structures at all. That may simply be a preferable implementation when radio HW 208 is implemented as a removable hardware item (e.g., a radio PCMCIA type card). Storing the data structures on the radio HW 208 in non-volatile memory enables a user to remove the card from one mobile device 18 and plug it into another and carry the information easily to the new device. It also allows for implementing more of the functions in the radio hardware. However, device driver 210 can also store these data structures in system memory and carry out the functions in software, although this may be less preferable in some respects.

In any case, FIG. 12A illustrates one embodiment in which radio HW 208 maintains key table 310, address table 312, group information table 314, group index table 316, and carrier and manufacturer information table 318. These data structures are fully described below.

Address Table This table is used to store address related information.

| Status (1) | ey ndex 1) | Expiration Date (2) | Address Tag (8) | Address Info n) | ddressName 32)* | escrip-tion 64)* |
|---|---|---|---|---|---|---|
| 0x01 | | 401 | PERSONAL | | | |
| 0x01 | | 0 | EXEC | | | |
| 0x01 | | 534 | NEWS | | | |
| 0x00 | | 0 | (empty) | | | |

Fields marked with '*' can be stored in volatile memory (e.g. in the registry) to save memory size of the non-volatile memory in radio HW. These have not been included in the size calculations.

Status: This is a flag byte. The following are illustrative flags:

| Flag Name | Value | Meaning |
|---|---|---|
| ADDRESS_FLAG_ENABLE | 0x01 | If set, the address is enabled (message received on this address wil be processed). If not set, messages received on this address are discarded by the card. |
| ADDRESS_FLAG_PRIORITY | 0x02 | If set, messages of this address should be delivered to the higher levels immediately (e.g. personal address). If not set, the messages can be buffered internally for later delivery. |
| ADDRESS_FLAG_AC_ONLY | 0x04 | This address is enabled only when external power is available. |
| ADDRESS_FLAG_PO_ONLY | 0x08 | This address is enabled only when the device is powered on. |
| | 0x10–0x80 | Reserved for future use |

The driver preferably detects AC and device ON/OFF status changes to enable/disable addresses based on ADDRESS_FLAG_AC_ONLY and ADDRESS_FLAG_PU_ONLY.

KeyIndex: If non-0, index into the key table for the associated key. This key is used when a message arrives on this address that does not use any service group code.

ExpirationDate If non-0, it indicates the date on which this address would be disabled. It is stored as, for example, number of days from Jan 1, 1997. Midnight is assumed (thus the expiration date is the last day of the service). Note that card or the driver may not be expected to act on this value—higher level applications will access and act on this value.

AddressTag: Tag for the address. The address tag is used only internally for programming and accessing the addresses.

AddressInfo: This is the address and associated information for the use of the underlying network (e.g. in FLEX system, this would be the capcode and associated properties such as Collapse value, Phase, etc. In cellular systems, this would be the EIN (equipment identification number)).

AdressName: Descriptive name for address (e.g. MSNBC NewsNow, etc. ).

Description Descriptive text for the address (e.g. "Your stock and company news channel").

Overall Size=(1+1+2+8+32)*1 =704 Bytes (For a Flex radio)

Key Table

This table is used to store security related information. This is illustratively a pooled resource as one or more service groups or addresses can share the same key.

| KeyTag (8) | AlgCode (4) | Key (16) |
|---|---|---|
|  |  |  |
|  |  |  |

KeyTag: Tag for the key. The key tag is used only internally for programming and accessing the key.

AlgCode: Encryption algorithm code. This is for use with the security algorithms.

Key: The security key. The driver illustratively supports storage of 16 byte keys (128-bits) for future versions.

Overall Size=(8+4+16)*16=448 bytes

Service Group Info. Table and Service Group Index Table

The service group table stores information on the service groups. Typically, look up for service group code and associated key is a more frequent and time critical task than insertion or deletion of service groups. Thus, the driver preferably has a data structure designed to accommodate this.

In the suggested implementation below, service group entries are sorted by address numbers and then by service group codes. A separate Service group index table stores index for the last entry for any given address. (It should be noted that his is simply one example implementation. It is optimized for service group code look up and to minimize the storage requirement. It requires that each time a new service group is defined, the table entries be shifted down to make space for it. However, other suitable implementation can be used as well.

In one illustrative embodiment, when an address is disabled, its service group entries are not removed or altered in anyway (however, since the card discards the messages for that address anyway, these entries will not be used).

KeyIndex is the index into the Key Table that is associated with this service group. Index 0 is reserved to mean "no key exists—the content for this service group is not encrypted"

| Service Group Code (1) | Status (1) | Key Index (1) | Expiration Date (1) | Service Group Tag (8) | Service Group Name (32)* | Description (64)* | Index (1) |
|---|---|---|---|---|---|---|---|
| 0x20 |  | 1 | 366 | Addr0Gp0 |  |  | Addr0 End |
| 0x21 |  | 1 | 400 | Addr0Gp1 |  |  | Addr1 End |
| 0x20 |  | 6 | 389 | Addr1Gp0 |  |  |  |
| 0x30 |  | 9 | 0 | Addr0Gp0 |  |  |  |
|  |  |  |  |  |  |  |  |
|  |  |  |  | – |  |  | AddrN End |
|  |  |  |  | – |  |  |  |
|  |  |  |  | AddrNGpN |  |  |  |
| (empty) |  |  |  | (empty) |  |  |  |
| (empty) |  |  |  | (empty) |  |  |  |

Fields marked with '*' can be stored in volatile memory (e.g. in the registry) to same memory size in the radio HW. These have not been included in the size calculations.

ServiceGroupCode Service group code in the printable ASCII range of 0x20 and 0x7E.

Status: This is a flag byte. The following flags are illustratively defined:

| Flag Name | Value | Meaning |
|---|---|---|
| GROUP_FLAG_ENABLE | 0x01 | If set, the service group is enabled (message received on this service group will be processed). If not set, messages received on this service group are discarded by the driver. |
| GROUP_FLAG_PRIORITY | 0x02 | If set, messages of this service group should be delivered to the higher levels immediately (e.g. Stock alert service group). If not set, the messages can be buffered internally for a later delivery. |
| GROUP_FLAG_AC_ONLY | 0x04 | This service group is enabled only when external power is available. |
| GROUP_FLAG_PO_ONLY | 0x08 | This service group is enabled only when the device is powered on. |
| | 0x10–0x80 | Reserved for future use |

The driver preferably detects AC and device ON/OFF status changes to enable/disable service groups based on GROUP_FLAG_AC_ONLY and GROUP_FLAG_PU_ONLY.

KeyIndex: If non-0, index into the key table for the associated key. This key is used when a message arrives on this service group code.

ExpirationDate If non-0, it indicates the date on which this service group would be disabled. It is stored, for example, as number of days from Jan 1, 1997. A time 12:01AM is assumed. Note that card or the driver is illustratively not expected to act on this value—higher level applications will access and act on this value.

ServiceGroupTag: Tag for the service group. The service group tag is used only internally for programming and accessing the service groups.

ServiceGroupName: Descriptive name for the Service group (e.g. "International News", "Local Weather", etc.). Suggested size of this field is 32 but OEM can support more.

Description: Descriptive text for the service group (e.g. "News from all around the world that affects your little community"). Suggested size of this field is 64 but OEM can support more.

Index table is used to quickly locate a service group for a given address.

Overall Size=(1+1+1+2+8)*64=832 (Service group table) (1)*16=16 (Index table)=848 bytes FIG. 12A also illustrates that driver 210 supports a library containing certain functions that are generic to the system, but which are preferably performed at the driver level for the sake of increased efficiency or security. The support library is statically linked to the remainder of the driver components. The driver support library illustrated in FIG. 12A includes the AnalyzeMessage function 320, the DeriveEncryptionKey function 322 and the DecryptAndValidateRadioPgmData function 324. These functions are described in detail later in the application.

Also, in the preferred embodiment, PMPC 212 is configured to invoke a number of I/O control calls to perform various operations. Driver 210 supports and implements the I/O control calls according to a predefined syntax and operation which is also described below.

The general type definitions used in the driver API will now be described. It should be noted that most of the following types map substantially directly to the data structures described above, although this is not necessary.

The following basic types are used:

BYTE Unsigned 8-bit

WORD Signed 16-bit

DWORD Signed 32-bit

TEXT String stored in a BYTE array. Since the length of the string is usually available in another field, null termination is not required.

The following type definitions indicate illustrative minimum size which the driver needs to support. The struct used in the API have actual length in another field.

| | | |
|---|---|---|
| RADIO_TAG struct | | |
| | TEXT Value[8] | Tags are used to identify a particular address, service group, or key entry |
| RADIO_KEY struct | | |
| | BYTE Value[16] | Stores the encryption keys. |
| RADIO_NAME struct | | |
| | TEXT Value[32] | Stores carrier name, manufacturer name, Address name, etc. |
| RADIO_DESC struct | | |
| | TEXT Value[64] | Stores description of the card, services, addresses, etc. |
| Complex Types (Structs) | | |
| All structures have the following two fields at the beginning: | | |
| | WORD wStructSize | Each struct has fixed size fields followed by the length of the variable fields. The variable fields follow in the same order as their lengths. The wStructSize field holds the size in bytes of the fixed part of the struct (i.e., fixed fields and the lengths of the variable fields). This field provides a versioning method as well that will be used for backward compatibility in the future releases. |
| | DWORD dwMemberValidMask | A mask indicating which fixed size fields of the struct are valid and can be used (for variable size fields, a length of 0 indicates that the field is not present). This allows us to use the same struct even if some fields are not required. This is especially useful when programming a single field within a struct without changing the values of other fields. |

In addition the variable length fields are grouped towards the end a length field for each one of them is provided. This allows expanding these structures without losing backward or forward compatibility. When accessing the variable length fields, the driver should use the wStructSize field's value as the start offset for the first variable length field. This will allow for forward compatibilty when additional fields are added to the struct (using wStructSize field ensures that these new fields will be ignored by the legacy drivers).

Although a wide variety of specific struct types are used in the normal operation of the driver API, only those related to programming are discussed herein. Such structs include the following:

Struct RADIO_ADDRESS

This struct contains information about the address.

| Size | Field |
|---|---|
| 2 | WStructSize = sizeof (RADIO_ADDRESS) |
| 4 | DwMemberValidMask |
| 1 | AddressNumber |
| 1 | Status |
| 2 | ExpirationDate |
| 1 | AddressTagLen = $N_1$ |
| 1 | KeyTagLen = $N_2$ |
| 1 | AddressNameLen = $N_3$ |
| 2 | WDescriptionLen = $N_4$ |
| 2 | WAddressInfoLen = $N_5$ |
| $N_1$ | AddressTag |
| $N_2$ | KeyTag |
| $N_3$ | AddressName |
| $N_4$ | Description |
| $N_5$ | AddressInfo |

| | |
|---|---|
| WORD wStructSize | sizeof (RADIO_ADDRESS) |
| DWORD dwMemberValidMask | A mask indicating which fields of the struct are valid. Construct the value by 'OR'ing one or more of the following: |
| | 0x0001    AddressNumber field is valid |
| | 0x0002    Status field is valid |
| | 0x0004    ExpirationDate field is valid |
| BYTE AddressNumber | Address entry number. Address entries are numbered 0 onwards. |
| BYTE Status | Status flags. |
| BYTE ExpirationDate[2] | Expiration date. 0 if none. |
| BYTE AddressTagLen | Length of the AddressTag field. |
| BYTE KeyTagLen | Length of the KeyTag field. |
| BYTE AddressNameLen | Length of the AddressName field |
| WORD wAddressDescriptionLen | Length of the AddressDescription field. |
| WORD wAddressInfoLen | Length of the AddressInfo field. |
| RADIO_TAG AddressTag | Address Tag. |
| RADIO_TAG KeyTag | Associated key for this address. (If the field is not present, then no key is associated with the address). |
| RADIO_DESC AddressDescription | Description for the address. Note that this information is illustratively not required to be in non-volatile memory. It is displayed to the user for information purpose only. |
| RADIO_ADDRESS AddressInfo | Address and associated information fields. This struct is protocol specific. For FLEX protocol it may contain the capcode information encoding collapse value, phase, address, etc. |

Struct RADIO_GROUP

This struct contains information about the service group.

| Size | Field |
|---|---|
| 2 | WStructSize = sizeof (RADIO_GROUP) |
| 4 | DwMemberValidMask |
| 2 | WGroupNumber |
| 1 | Status |
| 1 | GroupCode |
| 2 | ExpirationDate |
| 1 | GroupTagLen = $N_1$ |
| 1 | KeyTagLen = $N_2$ |
| 1 | AddressTagLen = $N_3$ |
| 1 | GroupNameLen = $N_4$ |
| 2 | WGroupDescriptionLen = $N_5$ |
| $N_1$ | GroupTag |
| $N_2$ | KeyTag |
| $N_3$ | AddressTag |
| $N_4$ | GroupName |
| $N_5$ | GroupDescription |

| | |
|---|---|
| WORD wStructSize | sizeof (RADIO_GROUP) |
| DWORD dwMemberValidMask | A mask indicating which fields of the struct are valid. Construct the value by 'OR'ing one or more of the following: |
| | 0x0001    GroupNumber field is valid |
| | 0x0002    Status field is valid |
| | 0x0004    GroupCode field is valid |
| | 0x0008    ExpirationDate field is valid |
| WORD wGroupNumber | Service group number. Service groups are numbered 0 onwards. |
| BYTE Status | Status flags |
| BYTE GroupCode | Service group code |
| BYTE ExpirationDate[2] | Expiration date. 0 if none. |
| BYTE GroupTagLen | Length of the GroupTag field. |
| BYTE KeyTagLen | Length of the KeyTag field. |
| BYTE AddressTagLen | Length of the GroupTag field. |
| BYTE GroupNameLen | Length of the GroupName field |
| WORD wGroupDescriptionLen | Length of the GroupDescription field |
| RADIO_TAG GroupTag | Service group Tag. |
| RADIO_TAG KeyTag | Associated key for this service group. (If the field is not present, then no key is associated with the service group). |
| RADIO_TAG AddressTag | Address this service group belongs to. |
| RADIO_DESC GroupDescription | Description for the service group. Note that this information is not required to be stored in the non-volatile memory. It is displayed to the user for information purpose only. |

Struct RADIO_KEY

This struct contains information about the encryption keys

| Size | Field |
|------|-------|
| 2 | wStructSize = sizeof (RADIO_KEY) |
| 4 | DwMemberValidMask |
| 1 | KeyNumber |
| 4 | DwAlgCode |
| 1 | KeyTagLen = $N_1$ |
| 1 | KeyLen = $N_2$ |
| $N_1$ | KeyTag |
| $N_2$ | Key |

| | |
|---|---|
| WORD wStructSize | sizeof (RADIO_KEY) |
| DWORD dwMemberValidMask | A mask indicating which fields of the struct are valid. Construct the value by 'OR'ing one or more of the following: |
| | 0x0001  KeyNumber field is valid |
| | 0x0002  dwAlgCode field is valid |
| BYTE KeyNumber | Key number. Keys are numbered 1 onwards. |
| DWORD dwAlgCode | Encryption algorithm code. |
| BYTE KeyTagLen | Length of the KeyTag field. |
| BYTE KeyLen | Length of the Key field. |
| RADIO_TAG KeyTag | Key Tag. |
| RADIO_KEY Key | The encryption key. |

Struct RADIO_PGM

This struct is used for programming addresses, service groups, keys, etc.

| Size | Field |
|------|-------|
| 2 | wStructSize = sizeof (RADIO_PGM) |
| 4 | dwMemberValidMask |
| 1 | OperationCode |
| 1 | TypeCode |
| 2 | wProgramDataLen = $N_1$ |
| 2 | wCheckSumLen = 2 |
| $N_1$ | ProgramData |
| 2 | CheckSum |

| | |
|---|---|
| WORD wStructSize | sizeof (RADIO_PGM) |
| DWORD dwMemberValidMask | A mask indicating which fields of the struct are valid. Construct the value by 'OR'ing one or more of the following: |
| | 0x0001  OperationCode field is valid |
| | 0x0002  TypeCode field is valid |
| BYTE OperationCode | Defines what operation to perform. Possible values are: |
| 0x01  RADIO_PGM_OPERATION_PROGRAM | program |
| 0x02  RADIO_PGM_OPERATION_UNPROGRAM | unprogram |
| BYTE TypeCode | Type of programming being performed. Possible values are: |
| 0x01 | RADIO_PGM_TYPE_CARRIER RADIO_CARRIER struct follows. |
| 0x02 | RADIO_PGM_TYPE_KEY RADIO_KEY struct follows. |
| 0x03 | RADIO_PGM_TYPE_ADDRESS RADIO_ADDRESS struct follows. |
| 0x04 | RADIO_PGM_TYPE_GROUP RADIO_GROUP struct follows. |
| WORD wProgramDataLen | Length of the ProgramData field. |
| WORD wCheckSumLen 2 | (Length of the checksum field, not required but defined for consistency's sake) |
| void ProgramData | One of the following data structure (based on TypeCode): RADIO_CARRIER CarrierInfo; RADIO_ADDRESS AddressInfo; RADIO_GROUP GroupInfo; RADIO_KEY KeyInfo; |
| WORD wCheckSum | Checksum of the entire struct except the checksum field itself. Checksum is calculated by adding up the struct byte by byte in a WORD and ignoring the overflow. |

Struct RADIO_CRYPT

This struct is used for cipher functionality related IO control calls.

| Size | Field |
|------|-------|
| 2 | WStructSize = sizeof (RADIO_CRYPT) |
| 4 | DwMemberValidMask |
| 4 | HcryptoProv |
| 4 | DwCryptoFlags |
| 4 | DwCryptoAlgId |
| 1 | AddressTagLen = $N_1$ |
| 1 | GroupTagLen = $N_2$ |
| 2 | WmsgSpecificDataLen = $N_3$ |
| $N_1$ | AddressTag |
| $N_2$ | GroupTag |
| $N_3$ | MsgSpecificData |

| | |
|---|---|
| WORD wStructSize | sizeof (RADIO_CRYPT) |
| DWORD dwMemberValidMask | A mask indicating which fields of the struct are valid. Construct the value by 'OR'ing one or more of the following: |
| | 0x0001  hCryptProv field is valid |
| | 0x0002  dwCryptoFlags field is valid |
| | 0x0004  dwCryptoAlgId field is valid |
| HCRYPTPROV hCryptoProv | handle to a Cryptography Service Provider |
| DWORD dwCryptoAlgId | Cryptography Algorithm ID, e.g. CALG_RC4 |
| DWORD dwCryptoFlags | Flags for Cryptography function CryptDeriveKey( ) e.g. CRYPT_EXPORTABLE |
| BYTE AddressTagLen | Length of the AddressTag field |
| BYTE GroupTagLen | Length of the GroupTag field |
| WORD wMsgSpecificDataLen | Length of MsgSpecificData |

-continued

| | field. |
|---|---|
| RADIO_TAG AddressTag | Address Tag |
| RADIO_TAG GroupTag | Service group Tag |
| BYTE MsgSpecificData [ ] | Message specific data |

As stated above, the I/O control calls are made from PMPC 212 to driver 210 in order to accomplish certain operations. As with the various data structures, a variety of I/O control calls are supported in the driver API. However, only those related to programming of driver 210 and radio card 208 are discussed herein. I/O control calls have the following syntax.

Syntax

```
BOOL                xxx_IOControl(
     DWORD          hOpenContext
     DWORD          dwCode
     PBYTE          pBufIn
     DWORD          dwLenIn
     PBYTE          pBufOut
     DWORD          dwLenOut
     PDWORD         pdwActualOut
);
```

Parameters

| hOpenContext | Specifies a handle identifying the open context of the device. The xxx_Open function creates and returns this identifier. |
|---|---|
| dwCode | Specifies a value indicating the I/O control operation to perform. These codes are device specific, and are usually exposed to application programmers by means of a header file. |
| pBufIn | Points to the buffer containing data to be transferred to the device. |
| dwLenIn | Specifies the number of bytes of data in the buffer specified for pBufIn. |
| pBufOut | Points to the buffer used to transfer the output data from the device. |
| dwLenOut | Specifies the maximum number of bytes in the buffer specified by pBufOut |
| pdwActualOut | Points to DWORD buffer the function uses to return the actual number of bytes received from the device. |

Return Value

Returns TRUE if the device successfully completed its specified I/O control operation, otherwise it returns FALSE.

RADIO_PROGRAM
 This IOCTL call allows the caller to program or un-program an address, service group, keys, or carrier information.
 Syntax

```
struct RADIO_PGM RadioPgm;
BOOL xxx_IOControl(
    DWORD hOpenContext
    DWORD dwcode = RADIO_PROGRAM
    PBYTE pBufIn = &RadioPgm
    DWORD dwLenIn = sizeof (RadioPgm)
    PBYTE pBufOut = NULL
    DWORD dwLenOut = 0
    PDWORD pdwActualOut = &dwWriteBytes
);
```

Operation
 The driver programs or un-programs the given item. For security reasons, the RadioPgm struct passed to this API is always encrypted. The driver should call the illustratively function DecryptAndValidateRadioPgmData() included in the driver support library to decrypt and validate the input data.

Remarks
 When performing a programming operation (RadioPgm.operationCode RADIO_PGM_OPERATION_PROGRAM), if the info struct does not have all the required fields then the driver processes the command in the following manner:

1. If the item being programmed already exists, change only those fields that exist in the info struct. Fields that are missing in the info struct retain their old values. For example, when programming an address, if the address already exists and the field AddressDescription is missing in the info struct then the old value of this field is retained. This gives the ability to change the entire item or individual fields.
2. If the item being programmed does not exist, then depending upon the missing field, it should either take a default value or the whole programming command should be rejected.

Programming a new carrier

| Field | Type | Default |
|---|---|---|
| dwFrequency | Required | |
| UserID | Required | |
| CarrierName | Optional | NULL |
| CarrierDescription | Optional | NULL |

Programming a new Address

| Field | Type | Default |
|---|---|---|
| AddressNumber | Optional | (see below) |
| AddressTag | Required | |
| Status | Required | |
| AddressDescription | Optional | NULL |
| KeyTag | Optional | NULL |
| ExpirationDate | Optional | 0x0000 |
| Address | Required | |

When programming a new address, AddressNumber is not required (the next available empty entry is used) but AddressTag is illustratively required. When changing an existing address, either AddressNumber or AddressTag can be used to refer to the desired address. If both are given then AddressNumber is used.

Programming a new Service group

| Field | Type | Default |
|---|---|---|
| WGroupNumber | Optional | (see below) |
| GroupTag | Required | |
| Status | Required | |
| GroupDescription | Optional | NULL |
| GroupCode | Required | |

-continued

| Field | Type | Default |
| --- | --- | --- |
| KeyTag | Optional | NULL |
| ExpirationDate | Optional | 0x0000 |
| AddressTag | Required | |

When programming a new service group, wGroupNumber is not required (the next available empty entry is used) but GroupTag is illustratively required. When changing an existing service group, either GroupNumber or GroupTag can be used to refer to the desired address. If both are given then GroupNumber is used.

Programming a new key

| Field | Type | Default |
| --- | --- | --- |
| KeyNumber | Optional | |
| KeyTag | Required | |
| AlgCode | Required | |
| Key | Required | |

When programming a new key, KeyNumber is not required (the next available empty entry is used) but KeyTag is required. When changing an existing key, either KeyNumber or KeyTag can be used to refer to the desired key. If both are given then KeyNumber is used.

RADIO_CRYPT_DERIVE_KEY

This IOCTL call allows the caller to program or un-program an address, service group, keys, or carrier information.

Syntax

```
HCRYPTKEY hKey;
BOOL                          xxx_IOControl (
    DWORD                     hOpenContext
    DWORD dwCode =            RADIO_CRYPT_
                              DERIVE_KEY
    PBYTE pBufIn =            &RadioCrypt
    DWORD dwLenIn =           sizeof (RadioCrypt)
    PBYTE pBufOut =           &hKey
    DWORD dwLenOut =          sizeof (hKey)
    PDWORD                    &dwWriteBytes
    pdwActualOut =
    );
```

Operation

This IO control is used by the security component of the system. It is used to get a handle to a key. Since this requires access to Electroinc ID (EID) that should illustratively not be exposed outside of the driver. A function DeriveEncryptionKey() is illustratively provided in the driver support library and is discussed in greater detail below to carry out the operation of this IO control. The driver should call this function and pass the handle to the key (hKey) returned by it. This way, a security component can get a handle to the key without getting access to the EID.

In order to implement the I/O control calls, driver 210 calls a number of the functions stored in its support library. Such functions are described below.

AnalyzeMessage()

```
Syntax
    BOOL                                              AnalyzeMessage(
        void                                              *pMsg
        DWORD                                             dwMsgLen,
        BOOL                                              *pDiscard
        BYTE *pServiceGroupCode);
    pMsg         Pointer to the message bytes.
    dwMsgLen     Length of the message.
    pDiscard     Receives a BOOL value indicating whether
                     the message should be discarded or
                     kept.
    pServiceGroupCode   Receives the Service Group code.
Returns
    Returns TRUE if service group code was found, FALSE
    otherwise.
Description
    This function analyzes the message to determine if
    it has a service group code. It may also analyze it
    for other characteristics to make a determination if
    this message should be kept or discarded.
DeriveEncryptionKey()
    Syntax
        BOOL                                          DeriveEncryptionKey(
            RADIO_CRYPT                                   *pCryptInput,
            BYTE                                          *pbKeyValue,
            DWORD       dwKeySizeHCRYPTKEY                 * phKey,
            );
        Some parameters to this function are provided by the
        caller, the driver simply passes them to this
        function. The rest of the parameters are available
        to the driver in its internal data structure
        pCrypt_Input    Input         to                             the
                            RADIO_CRYPT_DERIVE_KEY IOCTL call.
        pbKeyValue      The key that needs to be used. based on
```

| | |
|---|---|
| | the AddressTag and GroupTag fields within the RADIO_CRYPT structure (The caller to the IOCTL call provides these two fields, the driver needs to use them to locate the key stored in the Key table and then pass the key in pbKey parameter) |
| dwKeySize | Number of bytes in the pbKeyValue parameter. |

Returns

This function returns TRUE if the operation was successful, FALSE otherwise. If successful, it also returns a handle to the key produced from the given information.

Description

Encryption keys are illustratively derived based on one or more of the following information: key associated with the address, key associated with the service group, message specific data, certain flags, and an algorithm ID. This function processes all this and produces a handle to a key that can be used by the calling process to perform encryption/decryption operations.

DecryptAndValidateRadioPgmData()

Syntax

```
BOOL DecryptAndValidateRadioPgmData (
    PBYTE pInBuf = &RadioPgm
    DWORD dwInLen = sizeof (RadioPgm)
    PBYTE pKey = &ElectronicId (or Key)
    DWORD dwKeyLen = sizeof (ElectronicId)
    PBYTE pOutBuf = &DecryptedRadioPgm
    DWORD dwOutLen =
    sizeof (DecryptedRadioPgm)
    PDWORD pdwActualOut = &dwWriteBytes
    );
```

| | |
|---|---|
| pInBuf | Pointer to the input buffer holding the programming struct RADIO_PGM. |
| dwInLen | Size of the programming struct passed. |
| pKey | Pointer to the buffer holding key which could Electronic ID (EID) of the device or a valid key in the key table |
| dwKeyLen | Size of Key passed. |
| pOutBuf | Pointer to the output buffer to receive the decrypted struct. |
| dwOutLen | Size of the output buffer. It must be equal or greater than dwInLen |
| pdwActualOut | Receives number of bytes actually written into the output buffer. |

Returns

This function returns TRUE if the input struct was a valid struct. The decrypted struct is placed in the output buffer. If the function finds that the data was not properly encrypted, it returns FALSE and the driver should reject the programming command.

Description

The driver programming API require that the programming information passed to it is encrypted. This ensures that only the authorized source can program the device. This function performs the decryption and validation for the RADIO_PROGRAM IO control call of the driver.

Figure 12B:
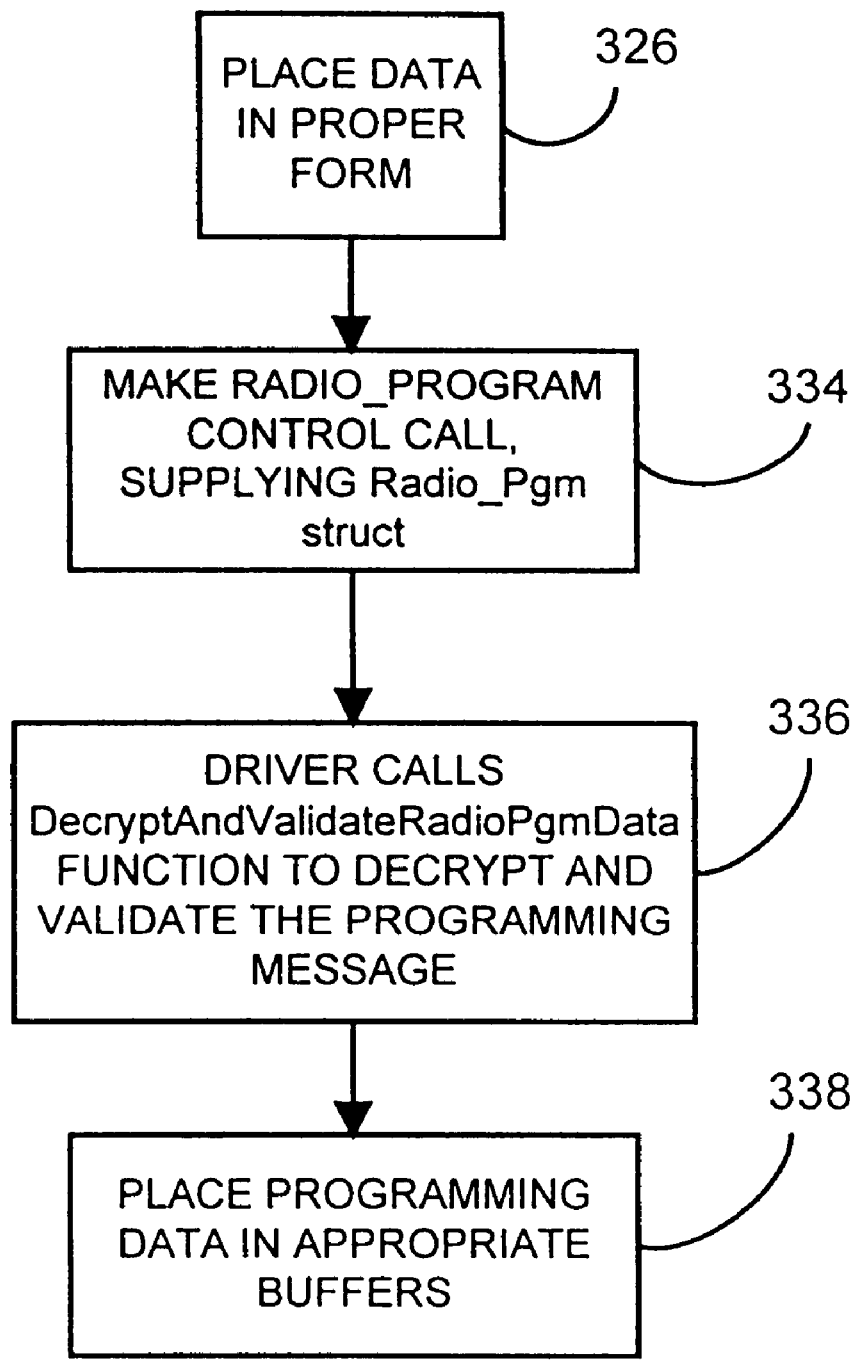

FIG. 12B is a flow diagram illustrating the operation of PMPC 212 and driver 210 in programming radio HW 208. Initially, after suitable translations are performed, PMPC 212 is provided with the programming message (via a message router) in one of the ways described above with respect to FIGS. 7 and 8, or in any other suitable way. PMPC 212 then detects, based on the header information, that the message is a programming message and invokes an appropriate IO control call to place the information from the programming message in proper form, given the data structures and the I/O control call syntax described above. This is indicated by block 326.

PMPC 212 then executes the RADIO_PROGRAM control call to driver 210, supplying the Radio_Pgm struct, as described above. This is indicated by block 334.

In response to this control call, driver 210 calls the DecryptAndValidateRadioPgmData function 324 which is stored in the driver support library. This function decrypts the program message provided in the RADIO_PROGRAM I/O control call. If this function finds that the input struct was a valid struct, it returns a true value to PMPC 212 and places the decrypted struct in its output buffer for access by radio HW 208. If this function finds that the struct was not properly encrypted, it returns a false value and rejects the programming command. This is indicated by blocks 336 and 338.

A programming component configured to program the specific radio HW 208 being used then accesses the information in the output buffer of driver 210 and performs the desired programming function.

It should be noted that the actual programming data provided to radio RW 208 can be provided according to a proprietary form, and the actual programming of radio HW 208 can be done in accordance with any proprietary parameters or constraints placed on it by the manufacturer. Thus, the manufacturer is free to define any programming operations, in accordance with any proprietary method. However, by supporting the above-defined data structures, radio HW 208 can be provided with proprietary programming data in an independent, open architecture fashion, regardless of the particular programming scheme used by radio HW 208, and regardless of the particular manner in which the programming message is transmitted to mobile device 18.

Even given this device/protocol/network independence, one obstacle still remains. There is currently no efficient method of determining whether mobile device 18 actually received the programming message, and has undertaken the requested programming operation. The system in accordance with one embodiment of the present invention addresses this obstacle as well.

Once the programming has been completed as indicated by driver 210 returning a value indicating the programming message contained a valid struct, PMPC 212 preferably generates an acknowledge message directed to originator 200, indicating the programming has been accomplished. This message is provided to sync component 28 on mobile device 18 (and shown in FIG. 1). The next time the user connects mobile device 18 to the desktop computer 16, sync components 26 and 28 cooperate to synchronize the acknowledgement message to desktop computer 16. The next time desktop computer 16 accesses the originator 200 of the programming message, the acknowledgement message is transmitted to the originator 200 indicating that the programming has been accomplished. In an embodiment in which desktop computer 16 is provided with a web browser, such as Internet Explorer 4.0, the acknowledgement message is transmitted back to the originator 200 when the web browser next invokes the scheduler to establish an Internet connection with the originator.

Thus, it can be seen that the present invention provides a device/protocol/network independent mechanism by which mobile device 18 can be programmed. The present invention also provides a method of encrypting data such that it can be sent in an encrypted and secured fashion from the originator 200 to mobile device 18. This mechanism allows the originator to program any suitable portions of mobile device 18, including addresses, groups, keys, validity periods, and macrotags. The present invention also provides backchannel confirmation which provides the originator with an acknowledgement that the programming has been accomplished.

Although the present invention has been described with reference to preferred embodiments, workers skilled in the art will recognize that changes may be made in form and detail without departing from the spirit and scope of the invention.

What is claimed is:

1. A programming interface on a mobile device for transferring information to and from a radio receiver on the mobile device, the programming interface including:
   a message processing component configured to receive messages to be delivered to the radio receiver; and
   a driver component coupled to the message processing component;
   wherein the message processing component is configured to execute a control call to the driver component specifying a control operation to be performed based on a message received, an input buffer location of an input buffer containing data to be transferred to the radio receiver, a number of bytes of information contained in the input buffer, an output buffer location of an output buffer containing information received from the radio receiver, a maximum number of bytes of information contained in the output buffer, and an actual number of bytes received from the radio receiver;
   wherein the control operation is a programming operation to program values in the radio receiver and wherein the control call passes a programming data structure to the driver, the programming data structure including:
      a structure size portion indicative of a size of the programming data structure;
      a mask portion Indicative of which portions in the programming data structure are valid;
      an operation code portion indicative of whether the programming operation is to program values or deprogram values;
      a type code portion indicative of a type of values to be programmed or deprogrammed;
      a program data portion indicative of the values to be programmed or deprogrammed; and
      a program data length portion indicative of a length of the program data; and
   wherein the driver component is configured to receive the control call from the message processing component and execute the specified control operation.

2. The programming interface of claim 1 wherein the radio receiver has existing values stored therein, wherein programming data portion comprises a programming data structure having a plurality of fields, each field corresponding to a value on the radio receiver and each field containing new values to be programmed into the radio receiver, and wherein existing values on the radio receiver are left unchanged when the field in the programming data structure does not have a field corresponding to the existing value.

3. The programming interface of claim 2 wherein the type code portion is indicative of an encryption key to be programmed or deprogrammed and wherein the program data portion comprises a key data structure.

4. The programming interface of claim 3 wherein the key data structure includes:
   a structure size portion indicative of a size of the key data structure;
   a mask portion indicative of which portions of the key data structure are valid;
   a key portion indicative of the encryption key;
   a key number portion indicative of a number corresponding to the encryption key;
   an algorithm portion indicative of an encryption algorithm to be used in conjunction with the encryption key;
   a key length portion indicative of a length of the encryption key;
   a key tag portion indicative of a location in which the encryption key is stored; and
   a key tag length portion indicative of a length of the key tag portion.

5. The programming interface of claim 1 wherein the mobile device receives messages over an address from a carrier and wherein the type code portion is indicative of a carrier designation to be programmed or deprogrammed and wherein the program data portion comprises a carrier data structure.

6. The programming interface of claim 5 wherein the carrier data structure includes:
   a structure size portion indicative of a size of the carrier data structure;
   a mask portion indicative of which portions of the carrier data structure are valid;
   a frequency portion indicative of a radio frequency at which the messages are received from the carrier;
   a name portion indicative of a name of the carrier;
   a description portion indicative of a description of message types received from the carrier;
   a user identification portion indicative of an identification number associated with a user of the mobile device;
   an user identification length portion indicative of a length of the user identification portion;
   a name length indicative of a length of the name portion; and
   a description length portion indicative of a length of the description portion.

7. The programming interface of claim 2 wherein the mobile device receives messages over an address and a group code corresponding to the address and wherein the type code portion is indicative of a group code to be programmed or deprogrammed and wherein the program data portion comprises a group code data structure.

8. The programming interface of claim 7 wherein the group code data structure includes:
- a structure size portion indicative of a size of the group code data structure;
- a mask portion indicative of which portions of the group code data structure are valid;
- an group code portion indicative of the group code;
- an group code number portion indicative of a number corresponding to the group code;
- a status portion indicative of a status of the group code;
- an expiration date portion indicative of an expiration date associated with the group code, wherein subsequent messages received over the group code after the expiration date are discarded;
- a group code tag portion indicative of a tag associated with the group code;
- an address tag portion indicative of a tag associated with the address;
- an address tag length portion indicative of a length of the address tag portion; and
- a group tag length indicative of a length of the group tag portion.

9. The programming interface of claim 8 wherein the group code data structure further includes:
- a key tag portion indicative of a location at which an encryption key used to decrypt messages received over the group code is stored; and
- a key tag length portion indicative of a length of the key tag portion.

10. The programming interface of claim 9 wherein the group code data structure further comprises:
- a group code name portion indicative of a descriptive name of the group code;
- a description portion indicative of a textual description of messages received over the group code;
- an group code name length portion indicative of a length of the group code name portion; and
- a description length portion indicative of a length of the description portion.

11. The programming interface of claim 2 wherein the mobile device receives messages over an address and wherein the type code portion is indicative of an address to be programmed or deprogrammed and wherein the program data portion comprises an address data structure.

12. The programming interface of claim 11 wherein the address data structure includes:
- a structure size portion indicative of a size of the address data structure;
- a mask portion indicative of which portions of the address data structure are valid;
- an address portion indicative of the address;
- an address number portion indicative of a number corresponding to the address;
- a status portion indicative of a status of the address;
- an address tag portion indicative of a tag associated with the address portion;
- an expiration date portion indicative of an expiration date associated with the address, wherein subsequent messages received over the address after the expiration date are discarded; and
- an address tag length portion indicative of a length of the address tag portion.

13. The programming interface of claim 12 wherein the address data structure further includes:
- a key tag portion indicative of a location at which an encryption key used to decrypt messages received over the address is stored; and
- a key tag length portion indicative of a length of the key tag portion.

14. The programming interface of claim 12 wherein the address data structure further comprises:
- an address name portion indicative of a descriptive name of the address;
- a description portion indicative of a textual description of messages received over the address;
- an address name length portion indicative of a length of the address name portion; and
- a description length portion indicative of a length of the description portion.

15. A programming interface on a mobile device for transferring information to and from a radio receiver on the mobile device, the programming interface including:
- a message processing component configured to receive messages to be delivered to the radio receiver; and
- a driver component coupled to the message processing component;
- wherein the message processing component is configured to execute a control call to the driver component specifying a control operation to be performed based on a message received, an input buffer location of an input buffer containing data to be transferred to the radio receiver, a number of bytes of information contained in the input buffer, an output buffer location of an output buffer containing information received from the radio receiver, a maximum number of bytes of information contained in the output buffer, and an actual number of bytes received from the radio receiver;
- wherein the driver component includes a function library of functions performed by the driver in executing the specified control operation, wherein the function library includes an encryption key derivation component for deriving an encryption key based on information provided to the driver component in the control call, wherein the driver component utilizes the encryption key derivation component to derive the encryption key, stores the encryption key at a key location in the driver component and returns a key handle indicative of the key location to the message processing component; and
- wherein the driver component is configured to receive the control call from the message processing component and execute the specified control operation.

16. A programming interface on a mobile device for transferring information to and from a radio receiver on the mobile device, the programming interface including:
- a message processing component configured to receive messages to be delivered to the radio receiver; and
- a driver component coupled to the message processing component;
- wherein the message processing component is configured to execute a control call to the driver component specifying a control operation to be performed based on a message received, an input buffer location of an input buffer containing data to be transferred to the radio receiver, a number of bytes of information contained in the input buffer, an output buffer location of an output buffer containing information received from the radio receiver, a maximum number of bytes of information contained in the output buffer, and an actual number of bytes received from the radio receiver;

wherein the driver component includes a function library of functions performed by the driver in executing the specified control operation, wherein the function library includes a decryption and validation component for decrypting and validating information provided to the driver component in the control call, the driver component utilizing the decryption and validation component to decrypt and validate the information and returning a value to the message processing component indicative of whether the information is valid; and wherein the driver component is configured to receive the control call from the message processing component and execute the specified control operation.

* * * * *

UNITED STATES PATENT AND TRADEMARK OFFICE
CERTIFICATE OF CORRECTION

PATENT NO. : 6,282,294 B1
DATED : August 28, 2001
INVENTOR(S) : Deo et al.

It is certified that error appears in the above-identified patent and that said Letters Patent is hereby corrected as shown below:

<u>Title page,</u>
Item [54], Title, replace "MOTOR" with -- MOBILE --.

<u>Drawings,</u>
Fig. 7, Box 222, replace "IDENTIY" with -- IDENTIFY --.

<u>Column 5,</u>
Line 34, replace "10" with -- device 18 --.

<u>Column 6,</u>
Line 31, replace "functions when" with -- functions. When --.
Line 56, replace "42" with -- 32 --.

<u>Column 7,</u>
Line 63, replace "DvD" with -- DVD --.

<u>Column 9,</u>
Line 16, delete "6".

<u>Column 11,</u>
Line 8, replace "crypted" with -- encrypted --.

<u>Column 12,</u>
Line 34, replace "Similalry" with -- similarly --.

<u>Column 13,</u>
Line 36, replace "from" with -- form --.

<u>Column 14,</u>
Lines 16-17, replace "ey ndex" with -- Key Index --.
Lines 16-17, replace "ddressN me" with -- Address Name --.
Line 17, replace "escrip-tion" with -- Description --.
Line 10, after "Address Table" move "This table is used to store address related information" to a new line.
Line 36, replace "ADDRESS_FLAG_$_{ENABLE}$" with -- ADDRESS_FLAG_ENABLE --.
Line 63, replace "ADDRESS_FLAG_PU_ONLY" with
-- ADDRESS_FLAG_PO_ONLY --.

UNITED STATES PATENT AND TRADEMARK OFFICE
CERTIFICATE OF CORRECTION

PATENT NO.    : 6,282,294 B1
DATED         : August 28, 2001
INVENTOR(S)   : Deo et al.

It is certified that error appears in the above-identified patent and that said Letters Patent is hereby corrected as shown below:

Column 15,
Line 1, replace "ExpirationDate" with -- ExpirationDate: --.
Line 17, replace "AdressName" with -- AddressName --.
Line 19, replace "Description" with -- Description: --.
Line 21, replace "(1+1+2+8+32) *1" with -- (1+1+2+8+32) *16 --.

Column 16,
Line 23, replace "his" with -- this --.
Line 23, "implementation." should be -- implementation.) --.
Table heading, col. 4, "(1)" should be -- (2) --.
Table, col. 5, row 5, "Add0Gp" should be -- Add2Gp --.
Line 22, delete "(".
Below table, "same" should be -- save --.

Column 17,
Line 1, "ServiceGroupCode" should be -- ServiceGroupCode: --.
Line 30, "GROUP_FLAG_PU_ONLY" should be -- GROUP_FLAG_PO_ONLY --.
Line 34, "ExpirationDate" should be -- ExpirationDate: --.

Column 18,
Line 55, "end a" should be -- end. A --.

Column 19,
Line 1, "RADIO ADDRESS" should be -- RADIO_ADDRESS --.

Column 22,
Line 36, "HcryptoProv" should be -- HCryptoProv --.
Line 54, "hCryptProv" should be -- hCryptoProv --.

Column 24,
Line 11, "operationCode RADIO" should be -- operationCode = RADIO --.

Column 26,
Line 21, "Electroinc" should be -- Electronic --.

Column 29,
Line 57, "Indicative" should be -- indicative --.

UNITED STATES PATENT AND TRADEMARK OFFICE
CERTIFICATE OF CORRECTION

PATENT NO.    : 6,282,294 B1
DATED         : August 28, 2001
INVENTOR(S)   : Deo et al.

It is certified that error appears in the above-identified patent and that said Letters Patent is hereby corrected as shown below:

Column 30,
Line 56, "an" should be -- a --.

Column 31,
Lines 8 and 9, "an" should be -- a --.
Line 38, "an" should be -- a --.

Signed and Sealed this

Fifteenth Day of April, 2003

JAMES E. ROGAN
*Director of the United States Patent and Trademark Office*